United States Patent
Karam

(10) Patent No.: US 11,927,772 B2
(45) Date of Patent: Mar. 12, 2024

(54) LIQUID LENS CONTROL SYSTEMS AND METHODS

(71) Applicant: CORNING INCORPORATED, Corning, NY (US)

(72) Inventor: Raymond Miller Karam, Santa Barbara, CA (US)

(73) Assignee: CORNING INCORPORATED, Corning, NY (US)

( * ) Notice: Subject to any disclaimer, the term of this patent is extended or adjusted under 35 U.S.C. 154(b) by 846 days.

(21) Appl. No.: 16/976,857

(22) PCT Filed: Mar. 5, 2019

(86) PCT No.: PCT/US2019/020795
§ 371 (c)(1),
(2) Date: Aug. 31, 2020

(87) PCT Pub. No.: WO2019/173368
PCT Pub. Date: Sep. 12, 2019

(65) Prior Publication Data
US 2020/0408965 A1 Dec. 31, 2020

Related U.S. Application Data

(60) Provisional application No. 62/639,424, filed on Mar. 6, 2018.

(51) Int. Cl.
*G02B 3/14* (2006.01)
*G02B 13/00* (2006.01)
(Continued)

(52) U.S. Cl.
CPC .............. *G02B 3/14* (2013.01); *G02B 26/005* (2013.01); *G02B 13/0075* (2013.01); *G02B 27/646* (2013.01)

(58) Field of Classification Search
CPC ........ G02B 26/005; G02B 3/14; G02B 21/32; G02B 26/0816; G02B 3/12; G02B 13/0075; G02B 27/646; A61B 1/0019
(Continued)

(56) References Cited

U.S. PATENT DOCUMENTS 7,808,717 B2 * 10/2010 Kuiper ............... G02B 26/0816
359/666
2008/0225378 A1 * 9/2008 Weikert ............... G02B 26/004
428/447
(Continued)

FOREIGN PATENT DOCUMENTS

| EP | 1906213 A1 | 4/2008 |
|----|-----------|--------|
| EP | 2009468 A1 | 12/2008 |
| EP | 2071367 A1 | 6/2009 |

OTHER PUBLICATIONS

Berry et al., "Fluidic microoptics with adjustable focusing and beam steering for single cell optogenetics", Optics Express, vol. 25, No. 14, 2017, pp. 16825-16839.
(Continued)

*Primary Examiner* — Collin X Beatty
(74) *Attorney, Agent, or Firm* — Tamika A. Crawl-Bey

(57) ABSTRACT

A liquid lens system can include a liquid lens and a controller. The liquid lens can include a chamber, first and second fluids contained in the chamber and substantially immiscible to form a fluid interface therebetween, a plurality of insulated electrodes that are insulated from the first and second fluids, and one or more electrodes in electrical communication with the first fluid. A position of the fluid interface can be based at least in part on voltages applied between the plurality of insulated electrodes and the one or more electrodes in electrical communication with the first fluid. The controller can provide voltages to the plurality of insulated electrodes to tilt the fluid interface along a tilt
(Continued)

direction, wherein a second average radius of curvature along a direction orthogonal to the tilt direction differs from a first average radius of curvature along the tilt direction by no more than about 20%.

19 Claims, 12 Drawing Sheets

(51) Int. Cl.
*G02B 26/00* (2006.01)
*G02B 27/64* (2006.01)

(58) Field of Classification Search
USPC .......................................................... 359/666
See application file for complete search history.

(56) References Cited

U.S. PATENT DOCUMENTS

2008/0297911 A1    12/2008  Christenson et al.
2009/0002807 A1*  1/2009  Hendriks ................ G02B 3/14
                                                                                            250/251

OTHER PUBLICATIONS

International Search Report and Written Opinion of the International Searching Authority; PCT/US19/020795; dated Jun. 3, 2019; 14 Pages; European Patent Office.

* cited by examiner

LIQUID LENS CONTROL SYSTEMS AND METHODS

CROSS-REFERENCE TO RELATED APPLICATIONS

This application claims the benefit of priority under 35 U.S.C. § 371 of International Application No. PCT/US2019/020795, filed on Mar. 5, 2019, which claims the benefit of priority under 35 U.S.C. § 119 of U.S. Provisional Application No. 62/639,424, filed Mar. 6, 2018, the content of each of which is incorporated herein by reference in its entirety.

BACKGROUND

Field

Some embodiments of this disclosure relate to liquid lenses and to control systems and control methods for liquid lenses.

Technical Background

Liquid lenses generally include two immiscible liquids disposed within a chamber. Varying the electric field to which the liquids are subjected can vary the wettability of one of the liquids with respect to the chamber wall, thereby varying the shape of the meniscus formed between the two liquids.

SUMMARY

Disclosed herein are liquid lens control systems and methods.

Disclosed herein are some embodiments of a liquid lens system comprising a liquid lens comprising a chamber, a first fluid contained in the chamber, a second fluid contained in the chamber, wherein the first fluid and the second fluid are substantially immiscible to form a fluid interface between the first fluid and the second fluid, a plurality of insulated electrodes that are insulated from the first and second fluids, and one or more electrodes in electrical communication with the first fluid, wherein a position of the fluid interface is based at least in part on voltages applied between the plurality of insulated electrodes and the one or more electrodes in electrical communication with the first fluid. In some embodiments, a controller is operable to provide voltages to the plurality of insulated electrodes to tilt the fluid interface along a tilt direction, wherein the tilted fluid interface is curved and has a first average radius of curvature along the tilt direction and a second average radius of curvature along a direction orthogonal to the tilt direction, and wherein the second average radius of curvature differs from the first average radius of curvature by no more than about 20%.

Disclosed herein are some embodiments of a liquid lens system comprising a liquid lens comprising a chamber, a first fluid contained in the chamber, a second fluid contained in the chamber, wherein the first fluid and the second fluid are substantially immiscible to form a fluid interface between the first fluid and the second fluid, a plurality of insulated electrodes that are insulated from the first and second fluids, and one or more electrodes in electrical communication with the first fluid, wherein a position of the fluid interface is based at least in part on voltages applied between the plurality of insulated electrodes and the one or more electrodes in electrical communication with the first fluid. In some embodiments, the plurality of insulated electrodes comprises a first insulated electrode on a first side of the chamber and a second insulated electrode on a second side of the chamber opposite the first side. In some embodiments, a controller is operable to obtain a target focal length value, wherein the controller is operable to provide a common voltage value to the plurality of insulated electrodes in response to the target focal length value when no fluid interface tilt is produced, obtain a target tilt direction, obtain a target tilt amount, provide a first voltage to the first insulated electrode based at least in part on the target focal length, the target tilt direction, and the target tilt amount, wherein the first voltage is higher than the common voltage value by a first voltage difference, and provide a second voltage to the second insulated electrode, wherein the second voltage is lower than the common voltage value by a second voltage difference to tilt the fluid interface along a tilt direction that intersects the first and second insulated electrodes, and wherein the first voltage difference is different than the second voltage difference.

Disclosed herein are some embodiments of a method of operating an electrowetting liquid lens that comprises a fluid interface between two fluids and a plurality of electrodes. In some embodiments, the method comprises providing voltages to the plurality of electrodes of the electrowetting liquid lens to curve the fluid interface and to tilt the curved fluid interface, wherein the voltages applied to the electrodes of the electrowetting liquid lens are asymmetrical.

DETAILED DESCRIPTION OF CERTAIN EMBODIMENTS

Figure 1:
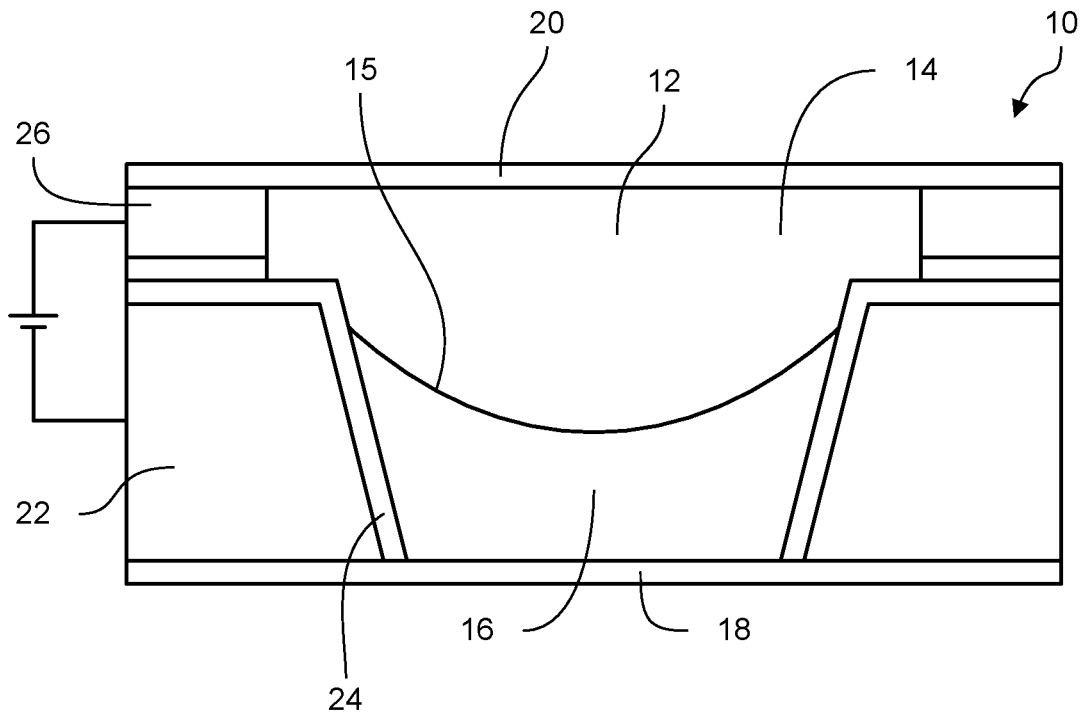
FIG. 1 is a schematic cross-sectional view of an example embodiment of a liquid lens in a first state in which no voltage is applied between the electrodes.

FIG. 1 is a cross-sectional view of an example embodiment of a liquid lens 10. The liquid lens 10 can have a cavity 12 that contains at least two fluids (e.g., liquids), such as first fluid 14 and a second fluid 16. The two fluids can be substantially immiscible so that a fluid interface 15 is formed between the first fluid 14 and the second fluid 16. The two fluids 14 and 16 can be sufficiently immiscible such that the fluid interface 15, when curved, can refract light with optical power as a lens. The first fluid 14 can be electrically conductive, and the second fluid 16 can be electrically insulating. The first fluid 14 can be a polar fluid, such as an aqueous solution, in some embodiments. The second fluid 16 can be an oil, in some embodiments. The first fluid 14 can have a higher dielectric constant than the second fluid 16. The first fluid 14 and the second fluid 16 can have different indices of refraction, for example so that light can be refracted at it passes through the fluid interface 15. The first fluid 14 and the second fluid 16 can have substantially similar densities, which can impede either of the fluids 14 and 16 from floating relative to the other.

The cavity 12 can include a portion having a shape of a frustum or truncated cone. The cavity 12 can have angled side walls. The cavity 12 can have a narrow portion where the side walls are closer together and a wide portion where the side walls are further apart. The narrow portion can be at the bottom end of the cavity 12 and the wide portion can be at the top end of the cavity 12 in the orientation shown, although the liquid lenses 10 disclosed herein can be positioned at various other orientations. The edge of the fluid interface 15 can contact the angled side walls of the cavity 12. The edge of the fluid interface 15 can contact the portion of the cavity 12 having the frustum or truncated cone shape. Various other cavity shapes can be used. For example, the cavity can have curved side walls (e.g., curved in the cross-sectional view of FIGS. 1-2). The side walls can conform to the shape of a portion of a sphere, toroid, or other geometric shape. In some embodiments, the cavity 12 can have a cylindrical shape. In some embodiments, the cavity can have a flat surface and the fluid interface can contact the flat surface (e.g., as a drop of the second fluid 16 sitting on the base of the cavity 12).

A lower window 18, which can include a transparent plate, can be below the cavity 12. An upper window 20, which can include a transparent plate, can be above the cavity 12. The lower window 18 can be located at or near the narrow portion of the cavity 12, and/or the upper window 20 can be located at or near the wide portion of the cavity 12. The lower window 18 and/or the upper window 20 can be configured to transmit light therethrough. The lower window 18 and/or the upper window 20 can transmit sufficient light to form an image, such as on an imaging sensor of a camera. In some cases, the lower window 18 and/or the upper window 20 can absorb and/or reflect a portion of the light that impinges on thereon.

A first one or more electrodes 22 (e.g., insulated electrodes) can be insulated from the fluids 14 and 16 in the cavity 12, such as by an insulation material 24. A second one or more electrodes 26 can be in electrical communication with the first fluid 14. The second one or more electrodes 26 can be in contact with the first fluid 14. In some embodiments, the second one or more electrodes 26 can be capacitively coupled to the first fluid 14. Voltages can be applied between the electrodes 22 and 26 to control the shape of the fluid interface 15 between the fluids 14 and 16, such as to vary the focal length of the liquid lens 10. Direct current (DC) voltage signals can be provided to one or both of the electrodes 22 and 26. Alternating current (AC) voltage signals can be provided to one or both of the electrodes 22 and 26. The liquid lens 10 can respond to the root mean square (RMS) voltage signal resulting from the AC voltage(s) applied. In some embodiments, AC voltage signals can impede charge from building up in the liquid lens 10, which can occur in some instances with DC voltages. In some embodiments, the first fluid 14 and/or the second one or more electrodes 26 can be grounded. In some embodiments, the first one or more electrodes 22 can be grounded. In some embodiments, voltage can be applied to either the first electrode(s) 22 or the second electrode(s) 26, but not both, to produce voltage differentials. In some embodiments, voltage signals can be applied to both the first electrode(s) 22 and the second electrode(s) 26 to produce voltage differentials.

Figure 2:
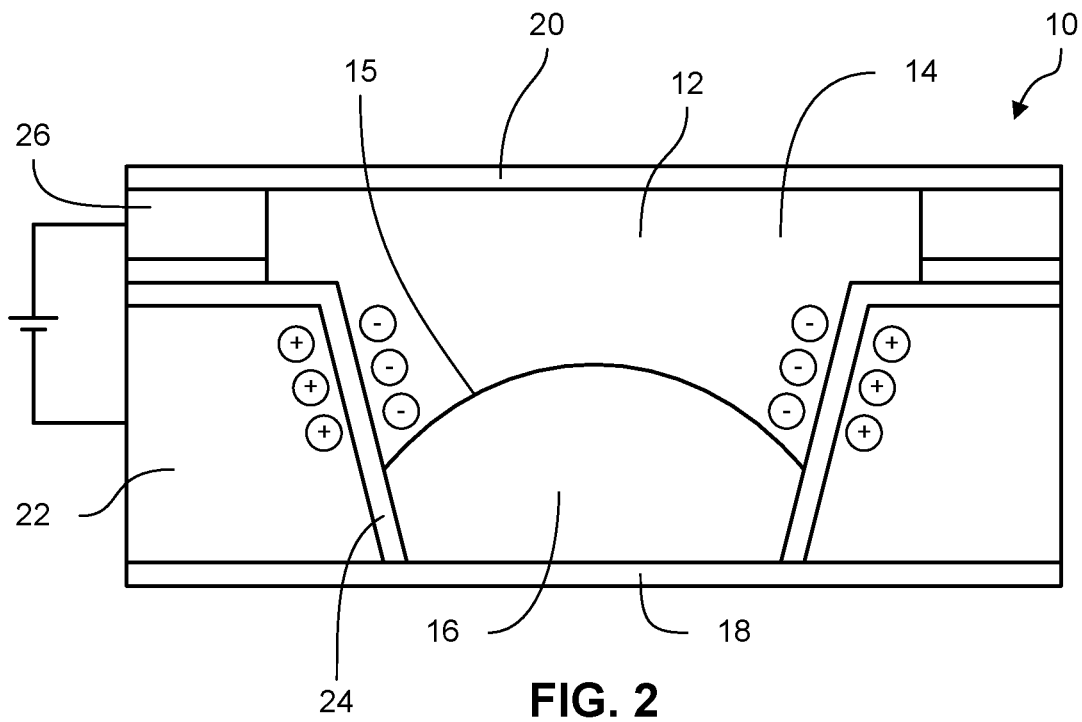
FIG. 2 is a schematic cross-sectional view of an example embodiment of a liquid lens in a second state in which a voltage is applied between the electrodes.

FIG. 1 shows the liquid lens 10 in a first state where no voltage is applied between the electrodes 22 and 26, and FIG. 2 shows the liquid lens 10 in a second state where a voltage is applied between the electrodes 22 and 26. The chamber 12 can have one or more side walls made of a hydrophobic material. For example the insulating material 24 can be parylene, which can be insulating and hydrophobic, although various other suitable materials can be used. When no voltage is applied, the hydrophobic material on the side walls can repel the first fluid 14 (e.g., an aqueous solution) so that the second fluid 16 (e.g., an oil) can cover a relatively large area of the side walls to produce the fluid interface 15 shape shown in FIG. 1. When a voltage is applied between the first electrode 22 and the first fluid 14 (e.g., via the second electrode 26), the first fluid 14 can be attracted to the first electrode 22, which can drive the location of the fluid interface 15 down the side wall so that more of the side wall are is in contact with the first fluid 14. Changing the applied voltage differential can change the contact angle between the edge of the fluid interface 15 and the surface of the cavity 12 (e.g., the angled side wall of the truncated cone portion of the cavity 12) based on the principle of electrowetting. The fluid interface 15 can be driven to various different positions by applying different amounts of voltage between the electrodes 22 and 26, which can produce different focal lengths or different amounts of optical power for the liquid lens 10.

Figure 3:
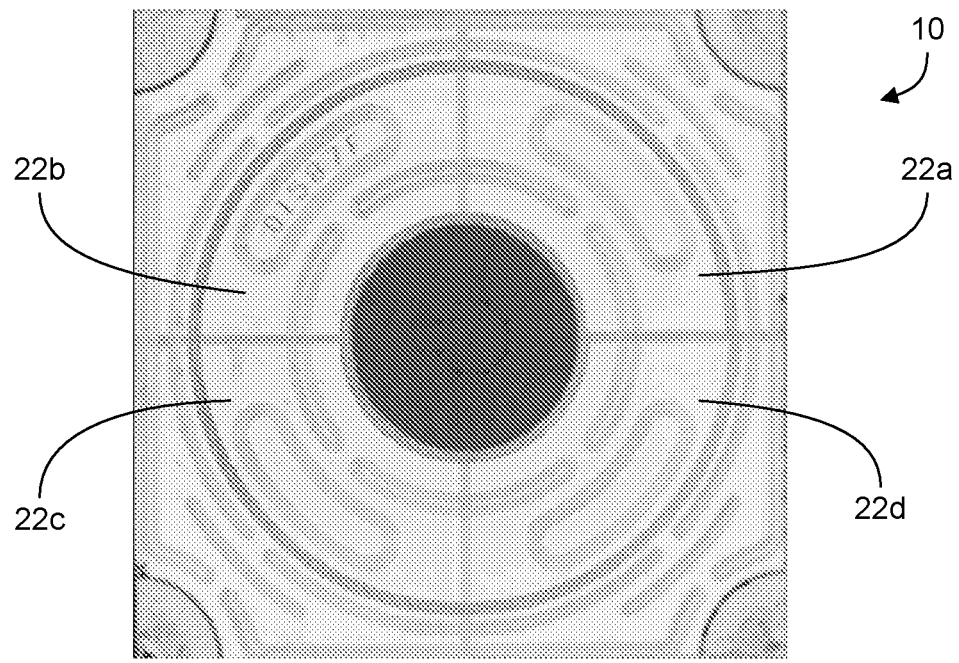
FIG. 3 is a plan view of an example embodiment of a liquid lens.
Figure 4:
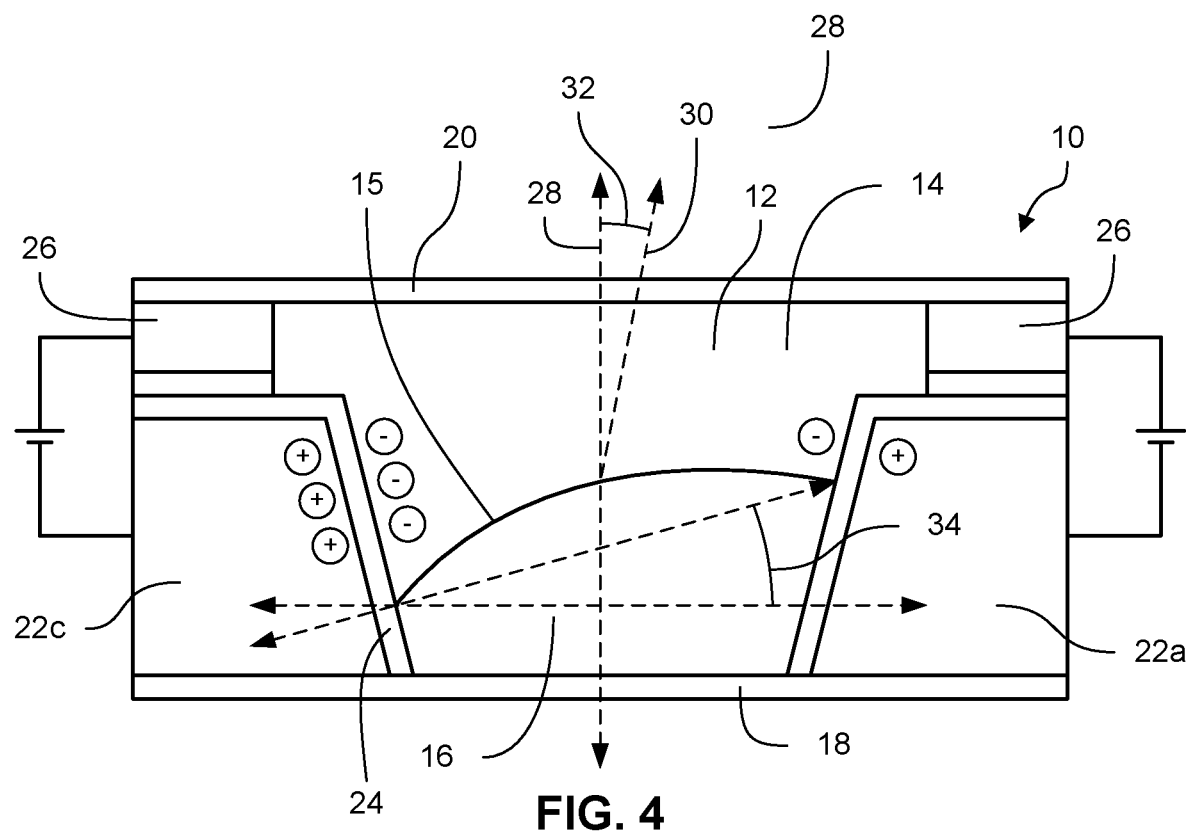
FIG. 4 is a schematic cross-sectional view of an example embodiment of a liquid lens taken through opposing electrodes.

FIG. 3 shows a plan view of an example embodiment of a liquid lens 10. In some embodiments, the first one or more electrodes 22 (e.g., insulated electrodes) can include multiple electrodes 22 positioned at multiple locations on the liquid lens 10. The liquid lens 10 can have four electrodes 22a, 22b, 22c, and 22d, which can be positioned in four quadrants of the liquid lens 10. In other embodiments, the first one or more electrodes 22 can include various numbers of electrodes (e.g., 1 electrode, 2 electrodes, 4 electrodes, 6 electrodes, 8 electrodes, 12 electrodes, 16 electrodes, 32 electrodes, or more, or an values therebetween). Although various examples are provided herein with even numbers of insulated electrodes 22, an odd number of insulated electrodes 22 can also be used. The electrodes 22a-d can be driven independently (e.g., having the same or different voltages applied thereto), which can be used to position the fluid interface 15 at different locations on the different portions (e.g., quadrants) of the liquid lens 10. FIG. 4 shows a cross-sectional view taken through opposing electrodes 22a and 22c. If more voltage is applied to the electrode 22c than to the electrode 22a, as shown in FIG. 4, the fluid interface 15 can be pulled further down the sidewall at the quadrant of the electrode 22c than at the quadrant of the electrode 22a.

The tilted fluid interface 15 can turn light that is transmitted through the liquid lens 10. The liquid lens 10 can have an axis 28. The axis 28 can be an axis of symmetry for at least a portion of the liquid lens 10. For example, the cavity 12 can be substantially rotationally symmetrical about the axis 28. The truncated cone portion of the cavity 12 can be substantially rotationally symmetrical about the axis 28. The axis 28 can be an optical axis of the liquid lens 10. For example, the curved and untilted fluid interface 15 can converge light towards, or diverge light away from, the axis 28. The axis 28 can be a longitudinal axis of the liquid lens 10, in some embodiments. Tilting the fluid interface 15 can turn the light 30 passing through the tilted fluid interface relative to the axis 28 by an optical tilt angle 32. The light 30 that passed through the tilted fluid interface 15 can converge towards, or diverge away from, a direction that is angled by the optical tilt angle 32 relative to the direction along which the light entered the liquid lens 10. The fluid interface 15 can be tilted by physical tilt angle 34 that produces the optical tilt angle 32. The relationship between the optical tilt angle 32 and the physical tilt angle 34 depends at least in part on the indices of refraction of the fluids 14 and 16.

The optical tilt angle 32 produced by tilting the fluid interface 15 can be used by a camera system to provide optical image stabilization, off-axis focusing, etc. In some cases different voltages can be applied to the electrodes 22a-d to compensate for forces applied to the liquid lens 10 so that the liquid lens 10 maintains on-axis focusing. Voltages can be applied to control both the curvature of the fluid interface 15, to produce a desired optical power or focal length, and the tilt of the fluid interface 15, to produce a desired optical tilt (e.g., an optical tilt direction and an amount of optical tilt). Accordingly, the liquid lens 10 can be used in a camera system to produce a variable focal length while simultaneously producing optical image stabilization.

Figure 5:
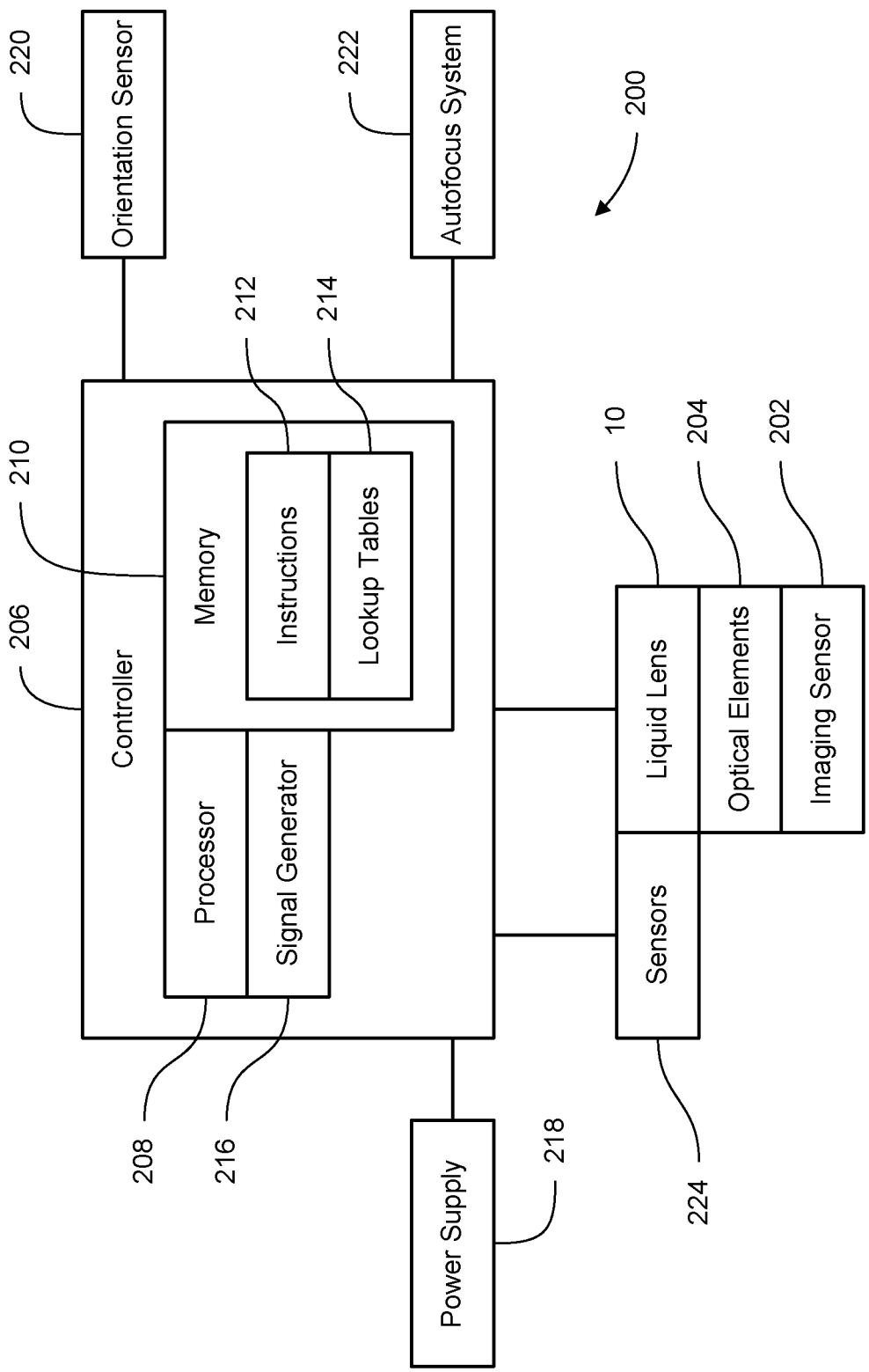
FIG. 5 is a block diagram of an example embodiment of a camera system that includes a liquid lens.

FIG. 5 is a block diagram of an example embodiment of a camera system 200 that includes a liquid lens 10, which can include features of any of the liquid lens embodiments disclosed herein. The camera system 200 can include an imaging sensor 202, which can be used to produce an image from light that impinges on the imaging sensor 202. The imaging sensor 202 can be charge-coupled device (CCD) sensor, a complementary metal-oxide semiconductor (CMOS) sensor, or any other suitable electronic imaging sensor. In some embodiments, photographic film can be used to produce an image, or any other suitable type of imaging sensor. The liquid lens 10 can direct light toward the imaging sensor 202. In some embodiments, the camera system 200 can include one or more additional optical elements 204 that operate on the light propagating toward the imaging sensor 202. The optical elements 204 can include one or more fixed lenses (e.g., a fixed lens stack), one or more movable lenses, one or more optical filters, or any other suitable optical elements for producing desired optical effects. The liquid lens 10 can operate on the light propagating towards the imaging sensor 202 before the one or more optical elements 204, after the one or more optical elements 204, or the liquid lens 10 can be positioned optically between optical elements 204. When light is described herein as propagating towards a component (e.g., towards the imaging sensor 202), the light can be propagating along a path that directly or indirectly leads to the component. For example, light can pass through the liquid lens 10 in a first direction while propagating along an optical path towards the imaging sensor 202, and the light can be redirected (e.g., reflected by a mirror and/or turned by refraction) to continue in a second direction (which can be different than, and even opposite to, the first direction) along the optical path towards the imaging sensor 202.

The camera system 200 can include a controller 206 for operating the liquid lens 10, for example to implement the liquid lens features and functionality disclosed herein. The controller 206 can operate other aspects of the camera system 200 as well. For example, a single controller 206 can operate the liquid lens 10, can operate the imaging sensor 202, can store images produced by the imaging sensor 202, can operate other components of the camera, such as a display, a shutter, a user interface, etc. In some embodiments, any suitable number of controllers can be used to operate the various aspects of the camera system 200. The controller 206 can output voltage signals to the liquid lens 10. For example, the controller 206 can output voltage signals to the insulated electrode(s) 22 and/or the electrode(s) in electrical communication with the conductive fluid 14, and the voltage signals can control the curvature of the fluid interface 15 (e.g., to produce a desired optical power) and/or to control the tilt of the fluid interface 15 (e.g., to produce a desired optical tilt). The controller 206 can output DC voltage signals, AC voltage signals, pulsed DC voltage signals, or any other suitable signals for driving the liquid lens 10.

The controller 206 can include at least one processor 208. The processor 208 can be a hardware processor. The processor 208 can be a computer processor. The processor 208 can be in communication with a computer-readable memory 210. The memory 210 can be non-transitory computer-readable memory. The memory 210 can include one or more memory elements, which can be of the same or different types. The memory 210 can include a hard disk, flash memory, RAM memory, ROM memory, or any other suitable type of computer-readable memory. The processor 206 can execute computer-readable instructions 212 store in the memory 210 to implement the functionality disclosed herein. In some embodiments, the processor 208 can be a general purpose processor. In some embodiments, the processor 208 can be a specialized processor that is specially configured to implement the functionality disclosed herein. The processor 208 can be an application specific integrated circuit (ASIC) and/or can include other circuitry configured to perform the functionality disclosed herein, such as to operate the liquid lens 10 as discussed herein.

The memory 210 can include one or more lookup tables 214, which can be used in determining the voltage signals to be applied to the liquid lens 10. The processor 208 can be configured to implement, and/or the computer-readable instructions 212 can include, one or more algorithms, equations, or formulas to be used in determining the voltage signals to be applied to the liquid lens 10. The processor 208 can determine the voltages to be applied to the liquid lens 10 (e.g., using one or more lookup tables 214 and/or one or more algorithms, equations, or formulas). Other information can be stored in the memory 210, such as images produced by the camera system 200, instructions for operating other components of the camera system 200, etc.

The controller 206 can include a signal generator 216, which can generate the voltage signals to be provided to the liquid lens 10. The signal generator 216 can generate the voltage signals in response to the voltage values determined by the processor 208. The signal generator 216 can include one or more amplifiers, switches, H-bridges, half-bridges, rectifiers, and/or any other suitable circuitry for producing the voltage signals. A power supply 218 can be used to produce the voltage signals to be provided to the liquid lens 10. The power supply 218 can be a battery, a DC power source, an AC power source, or any suitable source of electrical power. The signal generator 216 can receive power from the power supply 218 and can modulate or otherwise modify the electrical signals (e.g., based on determinations made by the processor 208) to provide driving signals to the liquid lens 10. In some embodiments, the processor 208 can signal generator 216 can be implemented together is a single integrated circuit (IC) or in combined circuitry.

In some embodiments, the controller 206 can receive input from an orientation sensor 220, such as a gyroscope, accelerometer, and/or other suitable sensor for providing information regarding the orientation of the camera system 200 and/or the liquid lens 10. In some embodiments, the orientation sensor 220 can be a MEMS (micro-electromechanical system) device. The orientation sensor 220 can provide a measurement of angular velocity, acceleration, or any suitable measurement that can be used to determine a desired optical tilt for the liquid lens 10. In some cases, when the camera system 200 shakes (e.g., in response to being held by a human, or vibrations from a driving car, etc.) the orientation sensor 220 (e.g., gyroscope) can provide input to the controller 206 regarding the shaking, and the liquid lens 10 can be driven to at least partially counter the shaking of the camera system 200 by controlling the tilt of the fluid interface 15 (e.g., tilt direction and amount of tilt).

The controller 206 (e.g., using the processor 208) can determine an optical tilt amount (e.g., angle 32) and/or an optical tilt direction (e.g., an angle) based at least in part on the input received from the orientation sensor 220, although in some embodiments these parameters can be received by the liquid lens controller 206 (e.g., determined by the orientation sensor 220 or some other component of the camera system 200). The signals for driving the liquid lens 10 (e.g., voltage signals) can be determined at least in part based on the determined or received optical tilt amount and/or optical tilt direction. In some cases, the controller 206 (e.g., using the processor 208) can determine a physical tilt amount (e.g., angle 34) and/or a physical tilt direction (e.g., an azimuthal angle) for the fluid interface 15. These can be determined from the determined or received optical tilt amount and/or optical tilt direction, or can be determined directly from the input received from the orientation sensor 220. The controller 206 (e.g., using the processor 208) can determine driver signals (e.g., voltages) for the electrodes (e.g., the insulated electrodes 22a-d in the embodiment of FIG. 3) to implement the physical tilt of the fluid interface 15. In some embodiments, the driver signals can be determined from the input received from the orientation sensor 220 directly, such as without determining the desired optical tilt, without determining the desired physical tilt of the fluid interface 15, and/or without determining any other intermediate values or parameters.

Many variations are possible. In some embodiments, the orientation sensor 220 can be omitted. For example, the camera system 200 can perform optical image stabilization (OIS) in response to image analysis or any other suitable approach. The controller 206 can receive OIS input information (e.g., derived by any suitable approach), and can control tilt of the fluid interface 15 in response to that OIS input information. In some cases, the lens tilt can be used for purposes other than OIS, such as for off-axis imaging. By way of example, the camera system 200 can zoom into a portion of the image that is not located at the center of the image. Controlling the tilt of the fluid interface 15 of the liquid lens 10 can, at least in part, be used to control the direction and amount of offset from center for the optical zoom. Although, not shown in FIG. 5, various embodiments disclosed herein can include two liquid lenses, such as for implementing an optical zoom function. The controller 206 can receive focal direction input information (e.g., for OIS or off-axis imaging), and can control tilt of the fluid interface 15 in response to that focal direction input information.

The controller 206 can receive optical power information. The input optical power information can include a target optical power (e.g., diopters) a target focal length, or other information that can be used to determine the curvature for the fluid interface 15. The optical power information can be determined by an autofocus system 222 of the camera system 200, can be set by input from a user (e.g., provide to a user interface of the camera system 200), or any other source. In some embodiments, the controller 206 can determine the optical power information. For example, the controller 206 can be used to implement the autofocus system that determines a desired optical power or focal length. In some cases, the controller 206 can receive the optical power information and can determine a corresponding optical power for the liquid lens 10, for example since the other optical elements 204 can also affect the optical power (e.g., statically or dynamically). The controller 206 (e.g., using the processor 208) can then determine driver signal(s) (e.g., voltages) for the electrode(s) to control the curvature of the fluid interface 15. In some cases, the controller 206 can determine the driver signal(s) directly from autofocus data or directly from optical power information, such as without determining a value for the optical power of the liquid lens and/or without determining any other intermediate values.

The controller 206 (e.g., using the processor 208) can use the focal direction information (e.g., OIS information, orientation information, shake information, etc.) and the focal length information (e.g., optical power information, autofocus information, etc.) together to determine the driver signal(s) for the liquid lens 10. For example, the driver signals to produce 1 degree of optical tilt and 3 diopters of optical power can be different than the driver signals to produce 1 degree of optical tile and 5 diopters of optical power. Various lookup tables 214, formulas, equations, and/or algorithms can be used to determine the driver signals based on both the focal length information and the focal direction information.

In some embodiments, the controller 206 can receive feedback and can drive the liquid lens 10 based at least in part on the feedback. The controller 206 can use a closed loop control scheme for driving the liquid lens 10. In some embodiments, the one or more sensors 224 can provide information to the controller, such as information regarding the fluid interface 15 position in the liquid lens 10. The sensors 224 can provide information regarding the fluid interface position for each of the insulated electrodes 22a-d. For example, the sensor 224 can provide a feedback signal that is indicative of the capacitance between the corresponding insulated electrode 22a-d and the first fluid 14. In some embodiments, the controller 206 can use a PID control scheme, an open loop control scheme, or any other suitable approach for controlling the liquid lens 10.

In some embodiments, the liquid lens 10 can be used in systems other than a camera system 200, such as an optical disc reader, an optical fiber input device, a device for reading output from an optical fiber, an optical system for biological measurement (e.g., inducing fluorescence in a biological sample), endoscopes, an optical coherence tomography (OCT) device, a telescope, a microscope, other types of scopes or magnifying devices, etc. Many of the principles and features discussed herein can relate to liquid lenses 10 used in various contexts. A liquid lens system can include a liquid lens 10 and a controller 206 for controlling the liquid lens. In some embodiments, various camera elements, such as the imaging sensor 202, autofocus system 222, orientation sensor 220, and/or other optical elements 204 can be omitted.

Figure 6:
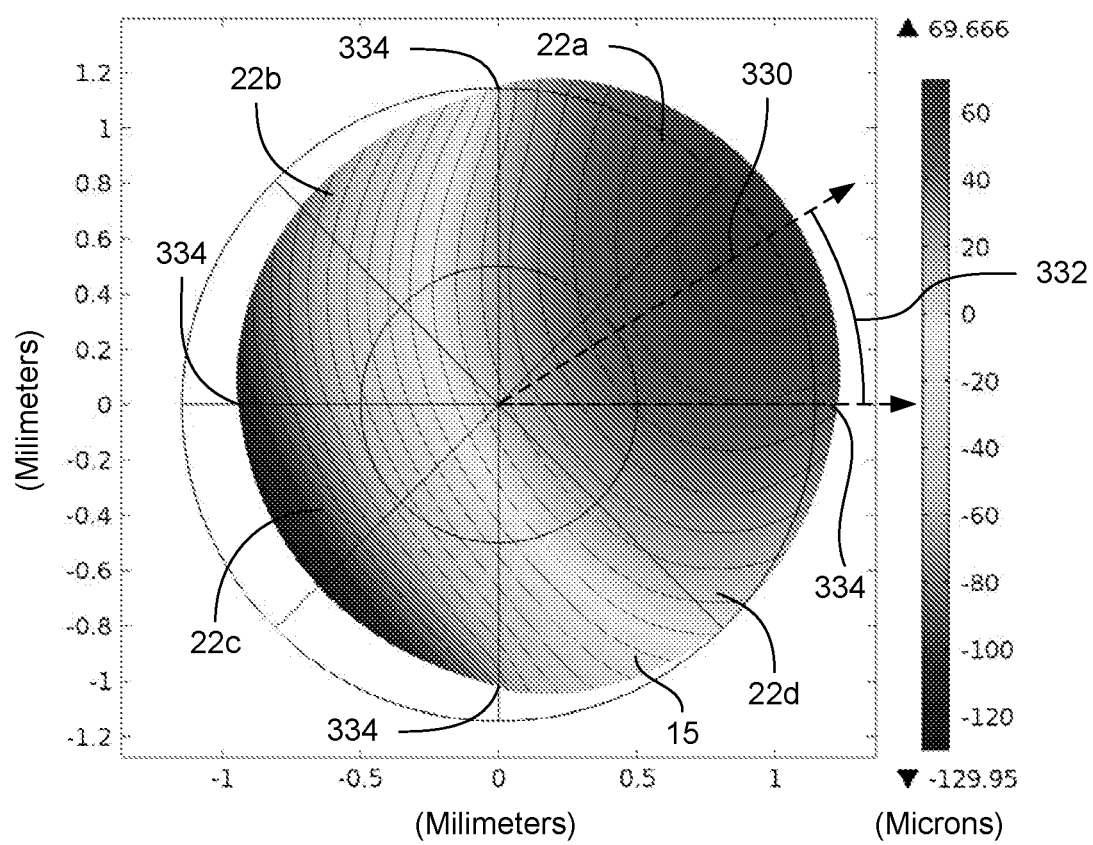
FIG. 6 is a topographic representation of an example embodiment of a tilted fluid interface.

In some instances, tilting the fluid interface 15 can cause optical aberrations or otherwise degrade the optical image quality. FIG. 6 shows an example embodiment of a tilted fluid interface 15. In FIG. 6, the liquid lens has four insulated electrodes 22a-d, and the fluid interface 15 is driven downward at the insulated electrode 22c by a distance of about −130 microns, and the fluid interface is driven upward at the insulated electrode 22a by a distance of about 70 microns. The fluid interface 15 is tilted along a tilt direction 330, which can have an azimuthal angle 332 of about 24 degrees. Because the different electrodes 22a-d are driven at different voltage values, discontinuities 334 in the fluid interface 15 shape can be produced at the borders between adjacent electrodes. The transition from one voltage to a different voltage across the electrode border can cause the edge of the fluid interface 15 at the electrode border to bulge, and this irregular shape of the fluid interface edge can affect the curvature of the fluid interface 15 surface. The discontinuities at the electrode borders can cause optical aberrations (e.g., trefoil), and/or can produce wavefront error, and/or can cause the fluid interface 15 to take a more aspherical or irregular shape. FIG. 6 shows gradient lines along the fluid interface 15, and the gradient lines are not circular. The gradient lines are most distorted at the edges of the fluid interface 15 at the borders between the electrodes 22a-d. As can be seen by the gradient lines in FIG. 6, the distortion on the fluid interface 15 is asymmetrical.

The controller 206 can determine voltages to by applied to the insulated electrodes 22a-d to improve the sphericity of the fluid interface 15 while also providing the desired optical power and tilt. Adjusting the voltages applied to the electrodes 22a-d can adjust the position of the edge of the fluid interface 15 at the electrodes 22a-d, and/or can adjust the contact angle of the fluid interface 15 at the electrodes 22a-d (e.g., the contact angle between the fluid interface 15 and the surface of the portion of the wall that is positioned between the electrode and the cavity 12). The adjusted voltages applied to the insulated electrodes 22a-d can be asymmetrical, as discussed herein. The adjusted voltages can produce a fluid interface that is curved and tilted and has a substantially spherical shape, as discussed herein.

Figure 7:
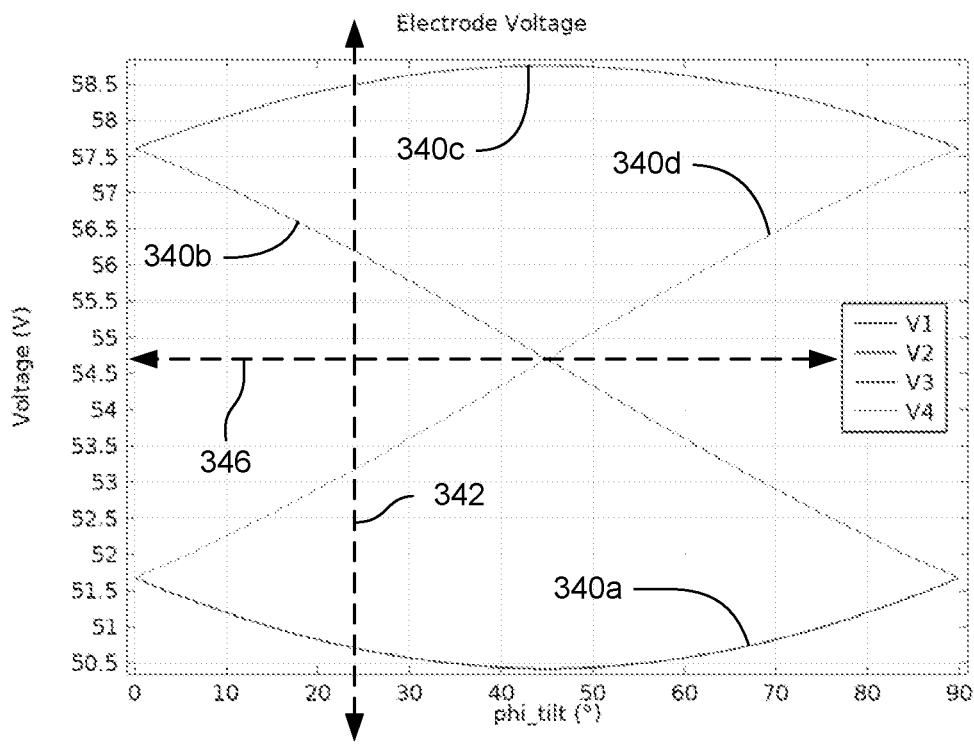
FIG. 7 is a plot of exemplary voltages applied to four electrodes for producing a fluid interface.
Figure 8:
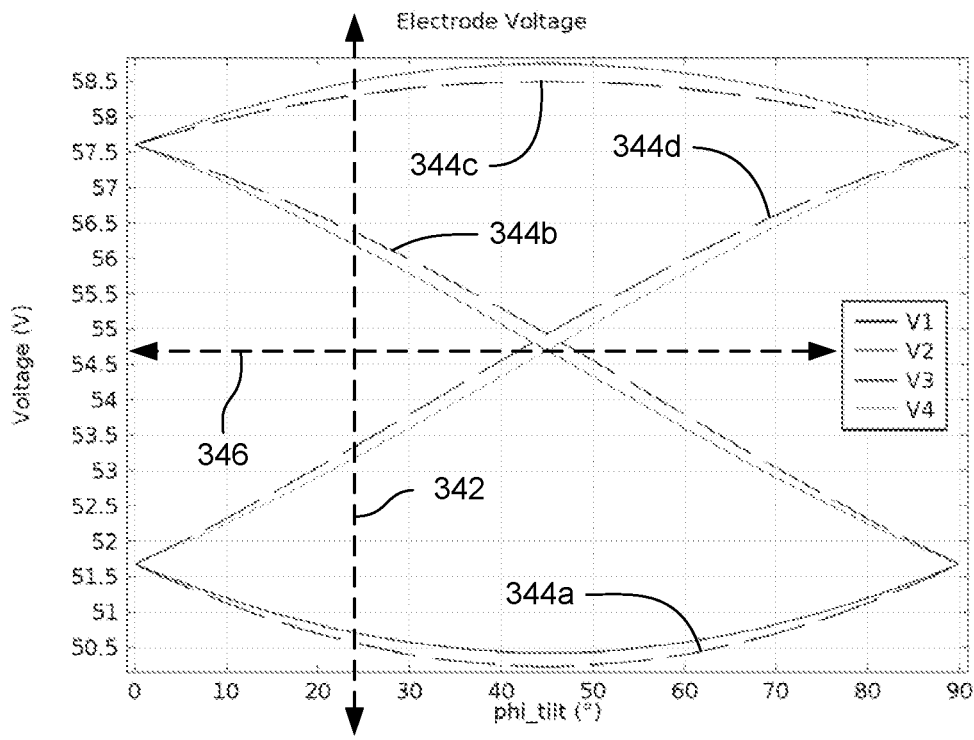
FIG. 8 is a plot of exemplary corrected voltages applied to four electrodes for producing an adjusted fluid interface.

FIG. 7 shows a plot of voltages for the four electrodes 22a-d for producing a fluid interface 15, such as the fluid interface of FIG. 6. FIG. 8 shows a plot of corrected voltages for the four electrodes 22a-d for producing a corrected fluid interface 15. The corrected voltages of FIG. 8 are overlaid over the voltages of FIG. 7 for ease of comparison. The y-axis shows the voltages applied to the four electrodes 22a-d. The x-axis shows the tilt direction angle 332. In FIG. 7, line 340a can correspond to the voltages applied to the first electrode 22a, line 340b can correspond to the voltages applied to the second electrode 22b, line 340c can correspond to the voltages applied to the third electrode 22c, and line 340d can correspond to the voltages applied to the fourth electrode 22d. The fluid interface of FIG. 6 can be produced, for example by applying the voltages at line 342, which corresponds to a tilt direction angle of about 24 degrees. Because this example has four electrodes 22a-d, the x-axis has a range from 0 to 90 degrees. Other numbers of electrodes can be used, such as eight electrodes, which would result in a similar plot having a range from 0 to 45 degrees. If the tilt direction angle 332 is past 90 degrees in this example, then a similar plot can apply, except that the voltages would be applied to a different ordering of the electrodes 22a-d. For example, at 100 degrees, the same voltages can be applied as shown in FIG. 7 or 8, except that line 340a would correspond to the second electrode 22b, line 340b would correspond to the third electrode 340c, line 340c would correspond to the fourth electrode 22d, and line 340d would correspond to the first electrode 22a. The voltages reflected in FIGS. 7 and 8 can be for a particular target optical power (e.g., 10 diopters) and a particular target tilt amount (e.g., 6 degrees of physical tilt). A different target optical power and/or a different target tilt amount would have different plots, which may be generally similar to FIGS. 7 and 8, but with different voltage values and/or different curve shapes.

Figure 9:
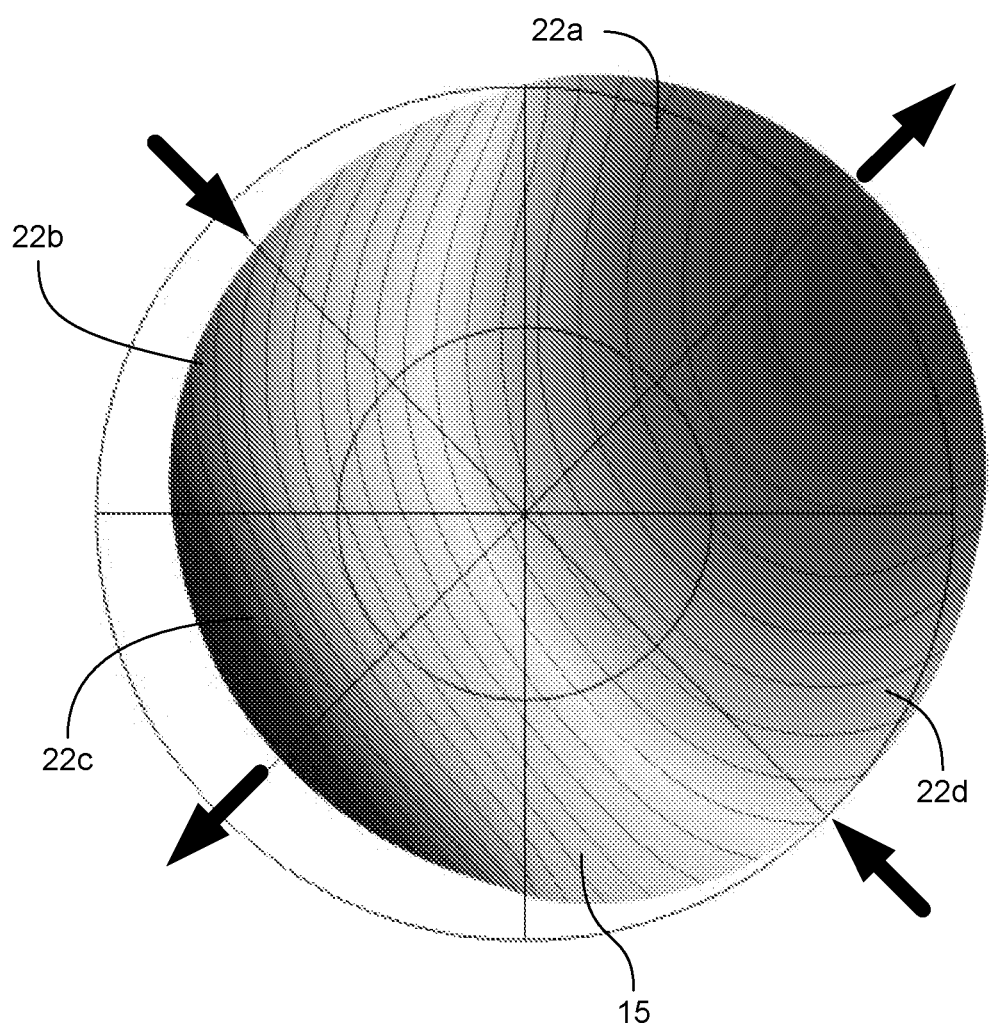
FIG. 9 is a topographic representation of an example embodiment of an adjusted tilted fluid interface.

The dashed lines 344a-d in FIG. 8 represent an example of corrected voltage values that can be applied to adjust the fluid interface shape (e.g., to increase sphericity). Line 344a can correspond to the voltage applied to the first electrode 22a, 344b can correspond to the voltage applied to the second electrode 22b, line 334c can correspond to the voltage applied to the third electrode, and line 344d can correspond to the voltage applied to the fourth electrode. FIG. 9 shows an example of how adjusting the voltages can adjust the fluid interface 15 of FIG. 6. With reference to FIGS. 8 and 9, the voltage 344a to the first electrode can be decreased, which can cause the fluid interface 15 to move upward at the first electrode 22a. The voltage 344b to the second electrode can be increased, which can cause the fluid interface 15 to move downward at the second electrode 22b. The voltage 344c to the third electrode can be decreased, which can cause the fluid interface 15 to move upward at the third electrode 22c. The voltage 344d to the fourth electrode can be increased, which can cause the fluid interface 15 to move downward at the fourth electrode 22d. These adjustments to the fluid interface position, and/or adjustments to the fluid interface contact angles at the electrodes 22a-d, can change the shape of the fluid interface 15 to increase the sphericity of the fluid interface 15, while still producing substantially the same optical power (e.g., 10 diopters) and the same tilt amount (e.g., 6 degrees of physical tilt). These voltage adjustments can also reduce the discontinuities in the fluid interface edge at the borders between electrodes 22a-d.

With reference to FIG. 8, the voltages applied to the electrodes can be asymmetrical. The average of the voltages applied to one set of opposing electrodes can be different than the average of the voltages applied to a different set of opposing electrodes. As can be seen in FIG. 8, at 24 degrees for example, the average of the voltage 344a applied to the first electrode 22a and the voltage 344c applied to the third electrode 22c can be about 54.5 volts, while the average of the voltage 344b applied to the second electrode 22b and the voltage 344d applied to the fourth electrode 22d can be about 54.9 volts. A voltage difference between a first pair of adjacent electrodes can be different than a voltage difference between a second pair of adjacent electrodes positioned opposite the first pair. The voltage steps between adjacent electrodes can be asymmetrical, which can provide improved control over the fluid interface shape at the borders between electrodes, which can at least partially smooth the discontinuities in the shape of the fluid interface edge.

The liquid lens can be configured to produce the same optical power (e.g., 10 diopters) without tilting the fluid interface 15 by applying a common voltage 346 to each of the insulated electrodes 22*a-d*. In FIG. 7, the voltages applied to the electrodes 22*a-d* to produce the tilted fluid interface 15 can be symmetrical about the common voltage 346 that would be applied to produce the substantially the same optical power (e.g., 10 diopters) without tilt. In FIG. 8, the voltages applied to the electrodes 22*a-d* to produce the tilted fluid interface 15 are asymmetrical about the common voltage 246 that would be applied to produce the substantially the same optical power (e.g., 10 diopters) without tilt. The voltage applied 344*a* applied to the first electrode 22*a* can be lower than the common voltage 346 by a first voltage difference. The voltage 344*c* applied to the third electrode 22*c* (e.g., opposite the first electrode 22*a*) can be higher than the common voltage 346 by a second voltage difference. The first voltage difference can be larger than the second voltage difference. At 24 degrees, for example, the voltage 344*b* applied to the second electrode 22*b* can be higher than the common voltage 346 by a third voltage difference, and the voltage 344*d* applied to the fourth electrode 344*d* can be lower than the common voltage value 346 by a fourth voltage difference. The third voltage difference can be larger than the fourth voltage difference. In some cases, for certain angles (e.g., from about 42 degrees to about 48 degrees in FIG. 8), the voltages applied to both opposing electrodes can be higher than the common voltage value 346 (as shown in FIG. 8), or both lower than the common voltage value 346 (not shown in FIG. 8).

The corrected fluid interface 15 can have a curved shape that substantially conforms to the surface of a sphere. The curved fluid interface 15 can deviate from the shape of a sphere by 0%, 0.5%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, 10%, 10.5%, 11%, 11.5%, 12%, 12.5%, 13%, 13.5%, 14%, 14.5%, 15%, 15.5%, 16%, 16.5%, 17%, 17.5%, 18%, 18.5%, 19%, 19.5%, 20%, or any values therebetween, or any ranges bounded by any combination of these values, although other implementations outside these ranges are possible. The percentage deviation from a sphere can be measured by the percentage difference between the diameter of the smallest sphere that encloses the fluid interface 15 and the diameter of the largest sphere that fits inside the fluid interface 15. For example, if the fluid interface 15 deviates from the shape of a sphere so that a 2.2 mm diameter sphere barely encloses the fluid interface 15 and so that a sphere with a diameter of 2.0 mm barely fits inside the fluid interface 15, then the fluid interface 15 would deviate from a circle by 9.09%. These values and ranges can apply to a fluid interface 15 that is tilted at a physical tilt amount angle 34 of 0.5 degrees, 1 degree, 2 degrees, 3 degrees, 4 degrees, 5 degrees, 6 degrees, 7 degrees, 8 degrees, 9 degrees, 10 degrees, 12 degrees, 15 degrees, 20 degrees, 30 degrees, or any values therebetween. These values and ranges can apply to a fluid interface 15 that is tilted to produce 0.1 degrees, 0.2 degrees, 0.3 degrees, 0.4 degrees, 0.5 degrees, 0.7 degrees, 1 degree, 1.5 degrees, 2 degrees, 3 degrees, 4 degrees, 5 degrees, 7 degrees, 10 degrees, or more of optical tilt, or any values therebetween. These values and ranges can apply to a fluid interface 15 that is curved to produce an optical power of −20 diopters, −15 diopters, −10 diopters, −7 diopters, −5 diopters, −3 diopters, −1 diopters, 1 diopter, 2 diopters, 3 diopters, 4 diopters, 5 diopters, 7 diopters, 10 diopters, 12 diopters, 15 diopters, 20 diopters, 25 diopters, 30 diopters, 40 diopters, or more, or any values therebetween. These values can apply to a fluid interface 15 that is curved to have an average radius of curvature of 50 mm, 40 mm, 30 mm, 25 mm, 20 mm, 15 mm, 12 mm, 10 mm, 8 mm, 6 mm, 5 mm, 4 mm, or less, or any values therebetween. The fluid interface 15 can be controlled at various different tilt angles and curvatures by controlling one or more of the number of electrodes (e.g., more electrodes providing more control over the fluid interface 15), the size of the liquid lens 10 (e.g., the diameter of the cavity 12 or some portion thereof, and/or the height of the cavity 12), the parameters of the fluids (e.g., indices of refraction, viscosity, conductivity, surface tension, etc.).

The fluid interface 15 can have a first average radius of curvature along the tilt direction 330 and a second average radius of curvature along the direction 336 orthogonal to the tilt direction 330, and the second average radius of curvature can differ from the first average radius of curvature by 0%, 0.5%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, 10%, 10.5%, 11%, 11.5%, 12%, 12.5%, 13%, 13.5%, 14%, 14.5%, 15%, 15.5%, 16%, 16.5%, 17%, 17.5%, 18%, 18.5%, 19%, 19.5%, 20%, or any values therebetween, or any ranges bounded by any combination of these values, although other implementations outside these ranges are possible. These values and ranges can apply to a fluid interface 15 that is tilted at a physical tilt amount angle 34 of 0.5 degrees, 1 degree, 2 degrees, 3 degrees, 4 degrees, 5 degrees, 6 degrees, 7 degrees, 8 degrees, 9 degrees, 10 degrees, 12 degrees, 15 degrees, 20 degrees, 30 degrees, or any values therebetween. These values and ranges can apply to a fluid interface 15 that is tilted to produce 0.1 degrees, 0.2 degrees, 0.3 degrees, 0.4 degrees, 0.5 degrees, 0.7 degrees, 1 degree, 1.5 degrees, 2 degrees, 3 degrees, 4 degrees, 5 degrees, 7 degrees, 10 degrees, or more of optical tilt, or any values therebetween. These values and ranges can apply to a fluid interface 15 that is curved to produce an optical power of −20 diopters, −15 diopters, −10 diopters, −7 diopters, −5 diopters, −3 diopters, −1 diopters, 1 diopter, 2 diopters, 3 diopters, 4 diopters, 5 diopters, 7 diopters, 10 diopters, 12 diopters, 15 diopters, 20 diopters, 25 diopters, 30 diopters, 40 diopters, or more, or any values therebetween. These values can apply to a fluid interface 15 that is curved to have an average radius of curvature of 50 mm, 40 mm, 30 mm, 25 mm, 20 mm, 15 mm, 12 mm, 10 mm, 8 mm, 6 mm, 5 mm, 4 mm, or less, or any values therebetween. The fluid interface 15 can be controlled at various different tilt angles and curvatures by controlling one or more of the number of electrodes (e.g., more electrodes providing more control over the fluid interface 15), the size of the liquid lens 10 (e.g., the diameter of the cavity 12 or some portion thereof, and/or the height of the cavity 12), the parameters of the fluids (e.g., indices of refraction, viscosity, conductivity, surface tension, etc.).

Figure 10:
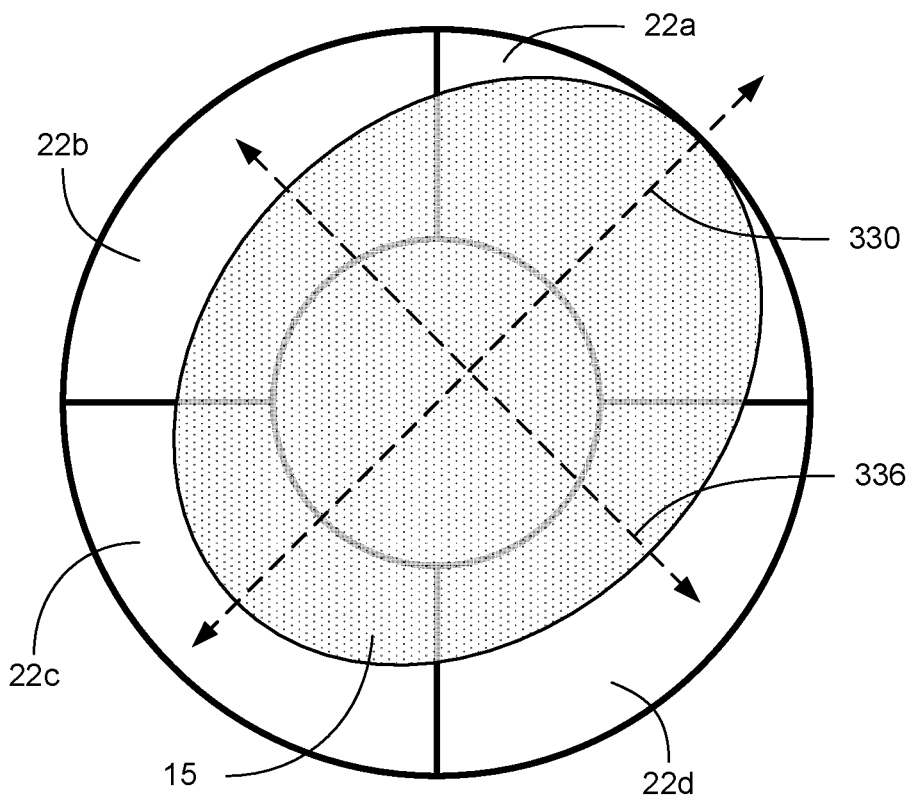
FIG. 10 is a graphical representation of an example embodiment of a tilted fluid interface.

Various types of adjustments can be made to the fluid interface 15 shape by controlling the voltages applied to the electrodes 22*a-d*. With reference to FIG. 10, in some instances, tilting the fluid interface 15 can cause the edge of the fluid interface to have a non-circular shape (e.g., a generally elliptical shape, a generally oval shape, an irregular shape, etc.). The voltages can be controlled to adjust the shape of the edge of the fluid interface to have a more circular shape. In some cases, the cavity 12 can have the shape of a truncated cone, and the tilted fluid interface 15 edge can have the shape of a conic section through the cavity 12, producing an elliptical shape. The elliptical shape can have a semi-major axis along the tilt direction 330 that is longer than a semi-minor axis along a direction 336 that is orthogonal to the tilt direction 330. In the example embodiment of FIG. 10, the liquid lens 10 has four insulated electrodes 22a-d, and the tilt direction 330 is at about 45 degrees through the first and third electrodes 22a, 22c. The resulting shape of the curved fluid interface 15 can have radius of curvature along the tilt direction 330 that is longer than the radius of curvature along the direction 336 that is orthogonal to the tilt direction 330. The curved fluid interface 15 can have optical aberration (e.g., astigmatism) and/or wavefront error caused by the tilting of the fluid interface 15.

Figure 11:
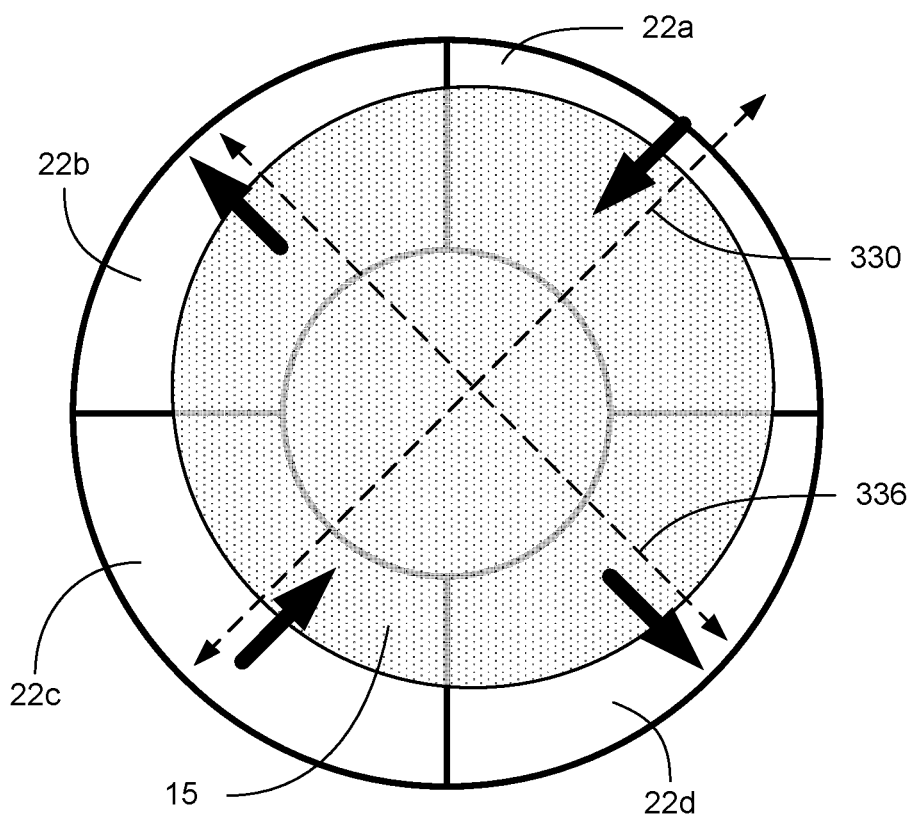
FIG. 11 is a graphical representation of an example embodiment of an adjusted tilted fluid interface.

FIG. 11 shows a tilted fluid interface 15 similar to FIG. 10, except that the fluid interface 15 shape of FIG. 11 has been at least partially corrected to reduce or eliminate optical aberration (e.g., caused by the generally elliptical shape of the fluid interface 15). As can be seen by comparing FIGS. 10 and 11, the fluid interface 15 of FIG. 11 has been stretched along the direction 336 that is orthogonal to the tilt direction 330, and the fluid interface 15 of FIG. 11 has been compressed along the tilt direction 330. This can produce a fluid interface edge that has a more circular shape (e.g., when projected onto a plane normal to the axis 28 or when projected onto a plane that is angled by the physical tilt angle 34 at the physical tilt direction 332).

In some cases, the fluid interface edge can be non-planar. For example, when the fluid interface 15 is stretched in the direction 336, the edges of the fluid interface 15 at the electrodes 22b and 22d are moved up the sidewalls. When fluid interface 15 is compressed in the tilt direction 330, the edges of the fluid interface 15 at the electrodes 22a and 22c are moved down the sidewalls. Accordingly, the edge of the fluid interface 15, as shown in FIG. 8, does not lie on a plane. For a plane angled at the physical tilt angle and direction, the fluid interface edge at the electrodes 22a and 22c would be positioned below the plane, while the fluid interface edge at the electrodes 22b and 22d would be positioned above the plane. The edge of the fluid interface can have the same shape as the edge of a hyperbolic paraboloid. In some cases, this shape for the fluid interface edge can improve the sphericity of the fluid interface 15, as compared to a more planar fluid interface edge.

Figure 12:
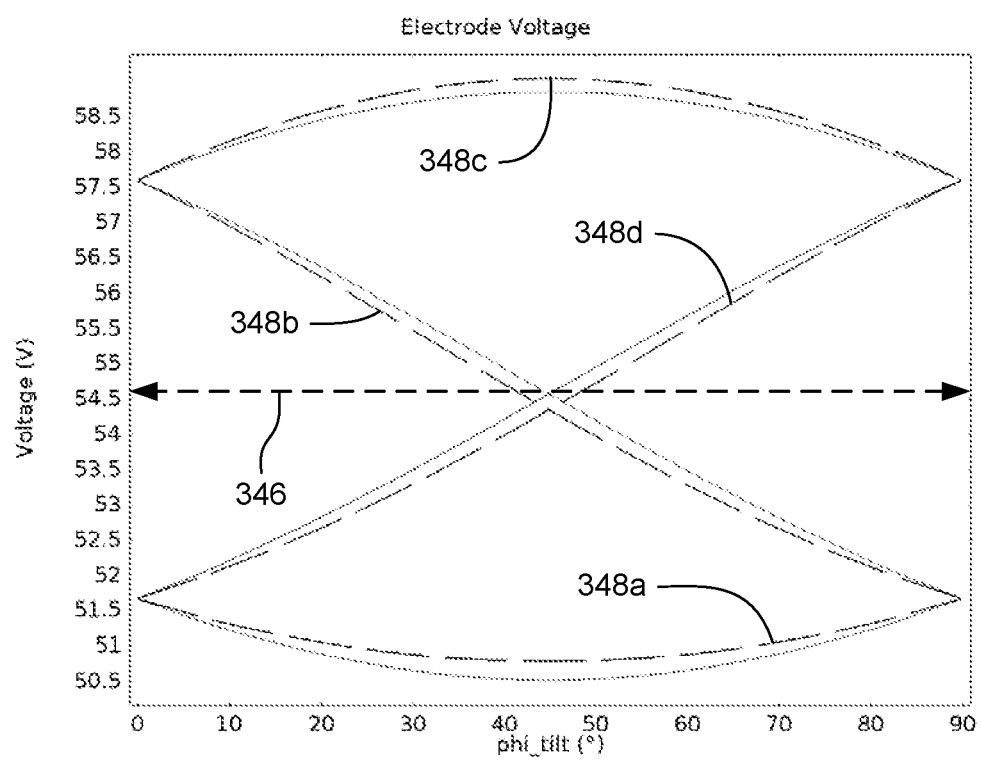
FIG. 12 is a plot of exemplary corrected voltages applied to four electrodes for producing an adjusted fluid interface.

Various different adjustments to the voltages can be used to produce various different corresponding adjustments to the fluid interface shape. FIG. 12 shows a plot similar to FIG. 8, except that the voltages are adjusted in the opposite directions. Raising the voltage for to the electrodes 22a and 22c can compress the fluid interface 15 (e.g., along the tilt direction 330). Lowering the voltages to the electrodes 22b and 22d can stretch the fluid interface 15 (e.g., along the direction 336 orthogonal to the tilt direction). In the example of FIG. 12, the voltages 348a-d can be asymmetrical, for example, similar to the discussion of FIG. 8, except that the voltages are shifted in opposing directions in FIGS. 8 and 12.

The fluid interface 15 can be controlled to have an edge that substantially conforms to the shape of a circle (e.g., when projected onto the plan that is normal to the axis 28 or that is tilted by the physical tilt amount 34 at the physical tilt direction 332). The edge of the fluid interface 15 can deviate from the shape of a circle by 0%, 0.5%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, 10%, 10.5%, 11%, 11.5%, 12%, 12.5%, 13%, 13.5%, 14%, 14.5%, 15%, 15.5%, 16%, 16.5%, 17%, 17.5%, 18%, 18.5%, 19%, 19.5%, 20%, or any values therebetween, or any ranges bounded by any combination of these values, although other implementations outside these ranges are possible. The percentage deviation from a circle can be measured by the percentage difference between the diameter of the smallest circle that encloses the fluid interface edge and the diameter of the largest circle that fits inside the fluid interface edge. For example, if the fluid interface edge deviates from the shape of a circle so that a 2.2 mm circle barely encloses the fluid interface edge and so that a circle of 2.0 mm barely fits inside the fluid interface edge, then the fluid interface edge would deviate from a circle by 9.09%. These values and ranges can apply to a fluid interface 15 that is tilted at a physical tilt amount angle 34 of 0.5 degrees, 1 degree, 2 degrees, 3 degrees, 4 degrees, 5 degrees, 6 degrees, 7 degrees, 8 degrees, 9 degrees, 10 degrees, 12 degrees, 15 degrees, 20 degrees, 30 degrees, or any values therebetween. These values and ranges can apply to a fluid interface 15 that is tilted to produce 0.1 degrees, 0.2 degrees, 0.3 degrees, 0.4 degrees, 0.5 degrees, 0.7 degrees, 1 degree, 1.5 degrees, 2 degrees, 3 degrees, 4 degrees, 5 degrees, 7 degrees, 10 degrees, or more of optical tilt, or any values therebetween. These values and ranges can apply to a fluid interface 15 that is curved to produce an optical power of −20 diopters, −15 diopters, −10 diopters, −7 diopters, −5 diopters, −3 diopters, −1 diopters, 1 diopter, 2 diopters, 3 diopters, 4 diopters, 5 diopters, 7 diopters, 10 diopters, 12 diopters, 15 diopters, 20 diopters, 25 diopters, 30 diopters, 40 diopters, or more, or any values therebetween. These values can apply to a fluid interface 15 that is curved to have an average radius of curvature of 50 mm, 40 mm, 30 mm, 25 mm, 20 mm, 15 mm, 12 mm, 10 mm, 8 mm, 6 mm, 5 mm, 4 mm, or less, or any values therebetween. The fluid interface 15 can be controlled at various different tilt angles and curvatures by controlling one or more of the number of electrodes (e.g., more electrodes providing more control over the fluid interface 15), the size of the liquid lens 10 (e.g., the diameter of the cavity 12 or some portion thereof, and/or the height of the cavity 12), the parameters of the fluids (e.g., indices of refraction, viscosity, conductivity, surface tension, etc.).

The edge of the fluid interface 15 can have a first width along the tilt direction 330 and a second width along the direction 336 orthogonal to the tilt direction 330, and the second width can differ from the first width by 0%, 0.5%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, 10%, 10.5%, 11%, 11.5%, 12%, 12.5%, 13%, 13.5%, 14%, 14.5%, 15%, 15.5%, 16%, 16.5%, 17%, 17.5%, 18%, 18.5%, 19%, 19.5%, 20%, or any values therebetween, or any ranges bounded by any combination of these values, although other implementations outside these ranges are possible. These values and ranges can apply to a fluid interface 15 that is tilted at a physical tilt amount angle 34 of 0.5 degrees, 1 degree, 2 degrees, 3 degrees, 4 degrees, 5 degrees, 6 degrees, 7 degrees, 8 degrees, 9 degrees, 10 degrees, 12 degrees, 15 degrees, 20 degrees, 30 degrees, or any values therebetween. These values and ranges can apply to a fluid interface 15 that is tilted to produce 0.1 degrees, 0.2 degrees, 0.3 degrees, 0.4 degrees, 0.5 degrees, 0.7 degrees, 1 degree, 1.5 degrees, 2 degrees, 3 degrees, 4 degrees, 5 degrees, 7 degrees, 10 degrees, or more of optical tilt, or any values therebetween. These values and ranges can apply to a fluid interface 15 that is curved to produce an optical power of −20 diopters, −15 diopters, −10 diopters, −7 diopters, −5 diopters, −3 diopters, −1 diopters, 1 diopter, 2 diopters, 3 diopters, 4 diopters, 5 diopters, 7 diopters, 10 diopters, 12 diopters, 15 diopters, 20 diopters, 25 diopters, 30 diopters, 40 diopters, or more, or any values therebetween. These values can apply to a fluid interface 15 that is curved to have an average radius of curvature of 50 mm, 40 mm, 30 mm, 25 mm, 20 mm, 15 mm, 12 mm, 10 mm, 8 mm, 6 mm, 5 mm, 4 mm, or less, or any values therebetween. The fluid interface 15 can be controlled at various different tilt angles and curvatures by controlling one or more of the number of electrodes (e.g., more electrodes providing more control over the fluid interface 15), the size of the liquid lens 10 (e.g., the diameter of the cavity 12 or some portion thereof, and/or the height of the cavity 12), the parameters of the fluids (e.g., indices of refraction, viscosity, conductivity, surface tension, etc.).

Figure 13:
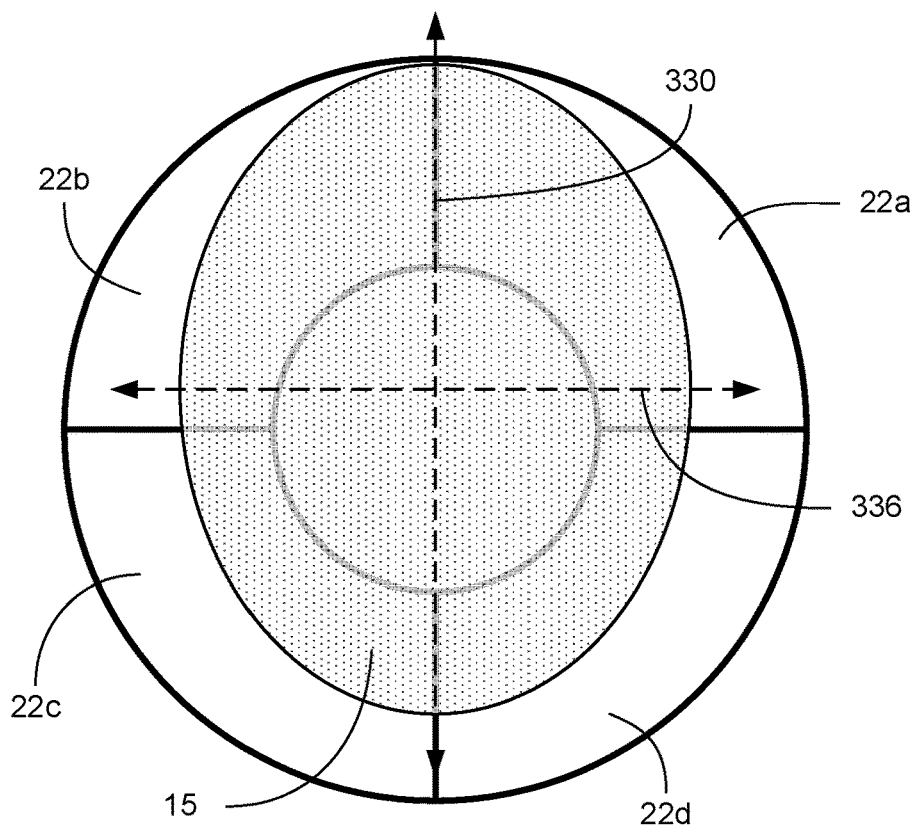
FIG. 13 is a graphical representation of an example embodiment of a tilted fluid interface.

Liquid lenses 10 having more than four insulated electrodes can provide more uniform improvement of the fluid interface 15 shape across different tilt directions. With reference to FIG. 13, for a liquid lens 10 having four insulated electrodes 22a-d, when the tilt direction 330 is along the border between adjacent electrodes (e.g., between electrodes 22a and 22b in FIG. 13), the electrodes 22a and 22b are driven at a first shared voltage (e.g., a relatively low voltage) to raise the fluid interface 15 along the border between the electrodes 22a and 22b, and the electrodes 22c and 22d are driven at a second shared voltage (e.g., a relatively high voltage) to lower the fluid interface 15 along the border between the electrodes 22c and 22d. In some embodiments, because the embodiment of FIG. 13 has only four electrodes 22a-d, the electrodes 22a-d do not modify (e.g., stretch or compress) the fluid interface 15 along the direction 336 orthogonal to the tilt direction 330, when the tilt direction 330 is along the border between electrodes 22a-d. FIG. 8 shows that at 0 degrees and at 90 degrees, which are the two borders of the electrode in a four-electrode embodiment, the corrected voltages merge with the uncorrected voltages. This illustrates that for a four-electrode liquid lens 10, the ability to correct the fluid interface 15 shape can be reduced as the tilt angle approaches the border of the electrode.

Figure 15:
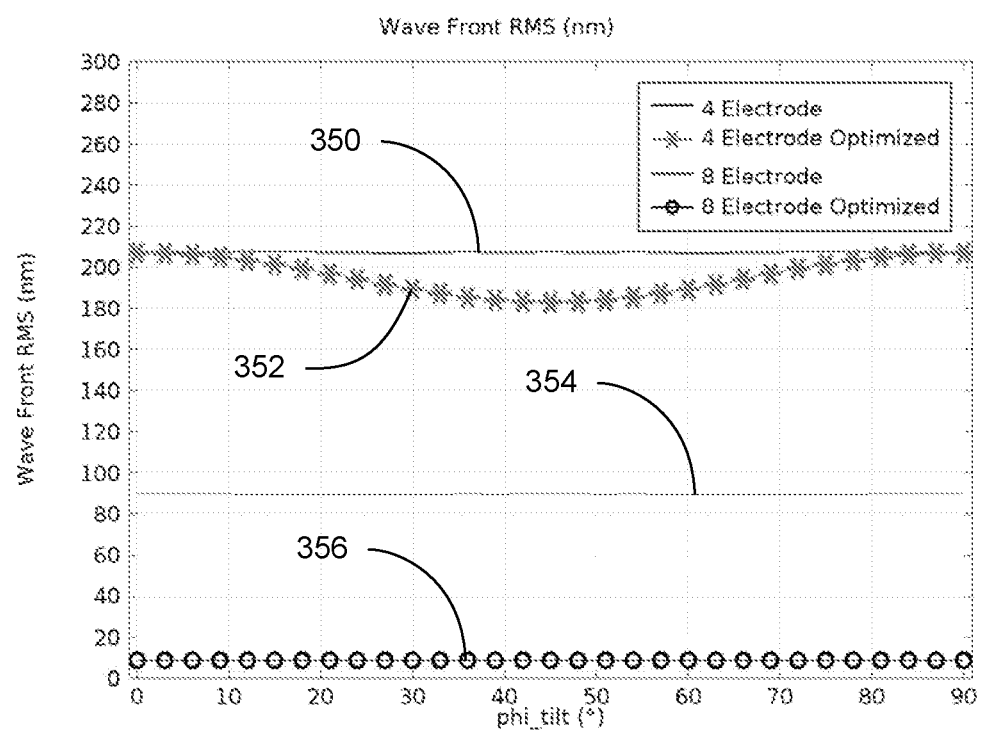
FIG. 15 is a plot of wave front error across angles between 0 degrees and 90 degrees for different exemplary liquid lenses.

FIG. 15 shows a plot 350 of wave front error across angles between 0 degrees and 90 degrees for a four-electrode liquid lens 10 that has not been corrected (e.g., applying the voltages 340a-d of FIG. 7). The plot 352 shows wave front error for a four-electrode liquid lens 10 that uses the improved voltages (e.g., the voltages 344a-d of FIG. 8 or the voltages 348a-d of FIG. 12), which can improve sphericity of the fluid interface 15. As can be seen in FIG. 15, the wave front error can be reduced the most by improving the shape of the fluid interface 15, as discussed herein, when the tilt direction angle 332 is at 45 degrees (e.g., FIG. 11). However, the improvement in wave front error can be reduced as the tilt direction angle 332 approaches the borders of the electrode at 0 degrees and at 90 degrees.

Figure 14:
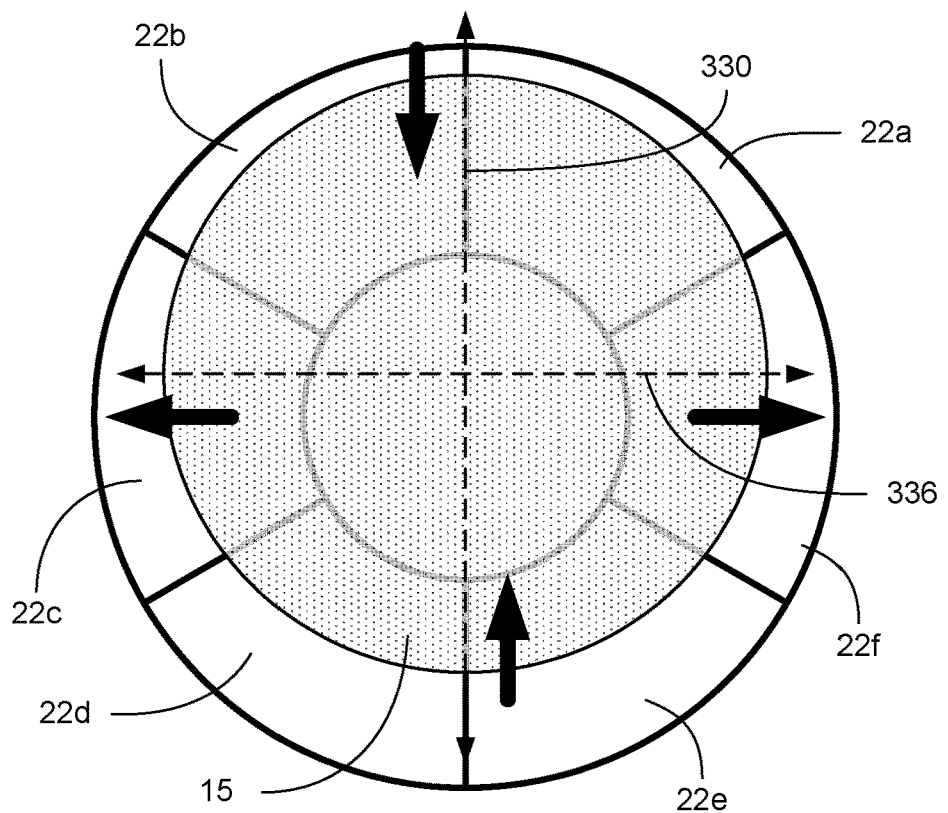
FIG. 14 is a graphical representation of an example embodiment of a tilted fluid interface.

FIG. 14 shows an example embodiment of a liquid lens 10 having six insulated electrodes 22a-f. The fluid interface 15 is shown tilted a tilt direction 330 that is along the border between two electrodes 22a and 22b, similar to FIG. 13. In the six-electrode embodiment of FIG. 14, the electrodes 22a and 22b are driven at a first shared voltage (e.g., a relatively low voltage) to raise the fluid interface 15 along the border between the electrodes 22a and 22b, and the electrodes 22d and 22e are driven at a second shared voltage (e.g., a relatively high voltage) to lower the fluid interface 15 along the border between the electrodes 22d and 22e. The additional two electrodes 22c and 22f can be used to modify (e.g., compress or stretch) the fluid interface 15, even when the tilt direction 330 is along a border between adjacent electrodes.

More insulated electrodes 22 can enable the liquid lens 10 to position the fluid interface 15 to more closely conform to the curvature of a sphere, which can reduce optical aberration and/or wave front error. More insulated electrodes 22 can also improve the consistency of the sphericity across various tilt direction angles 332, which can result in more consistent wave front error. For example, FIG. 15 shows a plot 354 of wave front error across angles between 0 degrees and 90 degrees for an eight-electrode liquid lens 10. As can be seen in FIG. 14, the wave front error can be lower for the eight-electrode liquid lens than for the four-electrode liquid lens. The additional electrodes can provide improved control over the fluid interface shape even without adjusting the voltages as described herein. FIG. 15 shows a plot 356 of wave front error for the eight-electrode liquid lens with the improved voltages applied thereto, according to the principles discussed herein. The reduction in wave front effort that results from improving the fluid interface 15 as discussed herein can have a more significant effect for the eight-electrode liquid lens than for the four-electrode lens. Also, the improvement in wave front error across the tilt directions is more consistent for the eight-electrode liquid lens than for the four-electrode liquid lens.

The fluid interface 15 can be controlled to produce wave front error (e.g., root-mean-square (RMS) wave front error) of 1000 nm, 700 nm, 500 nm, 400 nm, 300 nm, 250 nm, 225 nm, 200 nm, 175 nm, 150 nm, 125 nm, 100 nm, 75 nm, 50 nm, 40 nm, 30 nm, 20 nm, 15 nm, 10 nm, 5 nm, 3 nm, or less, or any values therebetween, or any ranges bounded by any combination of these values, although other implementations outside these ranges are possible. These values and ranges can apply to a fluid interface 15 that is tilted at a physical tilt amount angle 34 of 0.5 degrees, 1 degree, 2 degrees, 3 degrees, 4 degrees, 5 degrees, 6 degrees, 7 degrees, 8 degrees, 9 degrees, 10 degrees, 12 degrees, 15 degrees, 20 degrees, 30 degrees, or any values therebetween. These values and ranges can apply to a fluid interface 15 that is tilted to produce 0.1 degrees, 0.2 degrees, 0.3 degrees, 0.4 degrees, 0.5 degrees, 0.7 degrees, 1 degree, 1.5 degrees, 2 degrees, 3 degrees, 4 degrees, 5 degrees, 7 degrees, 10 degrees, or more of optical tilt, or any values therebetween. These values and ranges can apply to a fluid interface 15 that is curved to produce an optical power of −20 diopters, −15 diopters, −10 diopters, −7 diopters, −5 diopters, −3 diopters, −1 diopters, 1 diopter, 2 diopters, 3 diopters, 4 diopters, 5 diopters, 7 diopters, 10 diopters, 12 diopters, 15 diopters, 20 diopters, 25 diopters, 30 diopters, 40 diopters, or more, or any values therebetween. These values can apply to a fluid interface 15 that is curved to have an average radius of curvature of 50 mm, 40 mm, 30 mm, 25 mm, 20 mm, 15 mm, 12 mm, 10 mm, 8 mm, 6 mm, 5 mm, 4 mm, or less, or any values therebetween. The fluid interface 15 can be controlled at various different tilt angles and curvatures by controlling one or more of the number of electrodes (e.g., more electrodes providing more control over the fluid interface 15), the size of the liquid lens 10 (e.g., the diameter of the cavity 12 or some portion thereof, and/or the height of the cavity 12), the parameters of the fluids (e.g., indices of refraction, viscosity, conductivity, surface tension, etc.).

Figure 16:
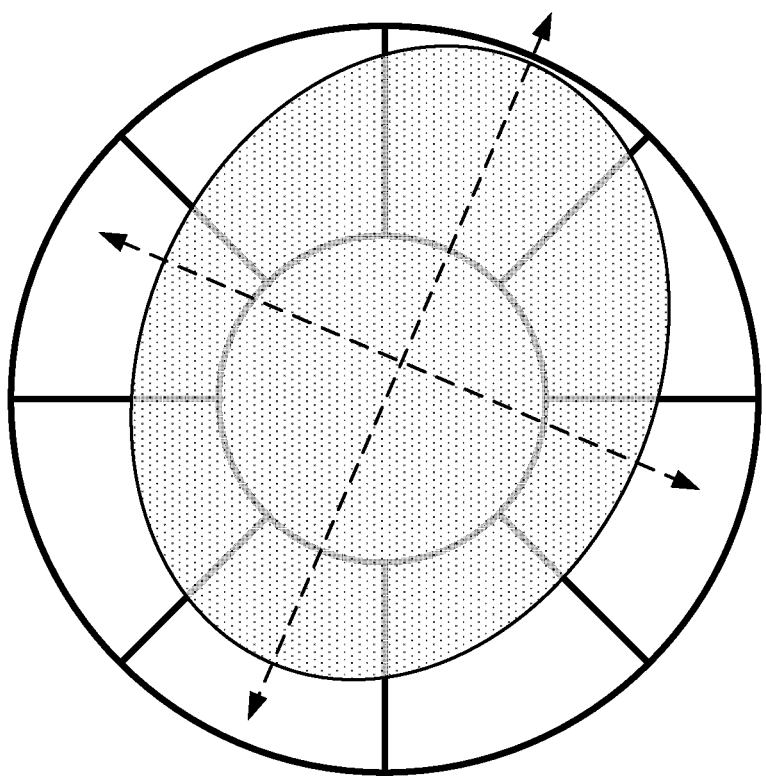
FIGS. 16 and 17 are graphical representations of exemplary tilted fluid interfaces.
Figure 17:
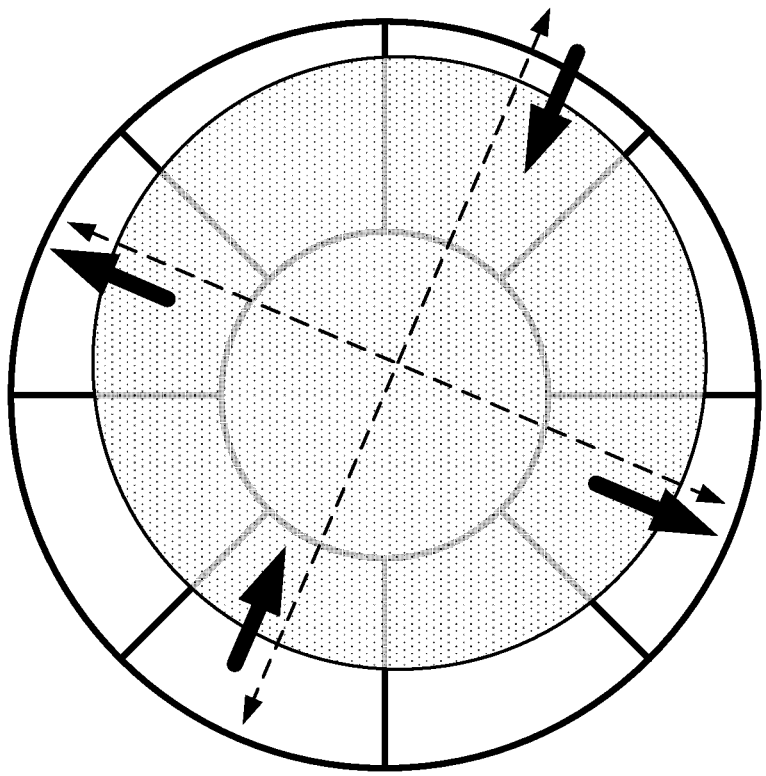
Figure 18:
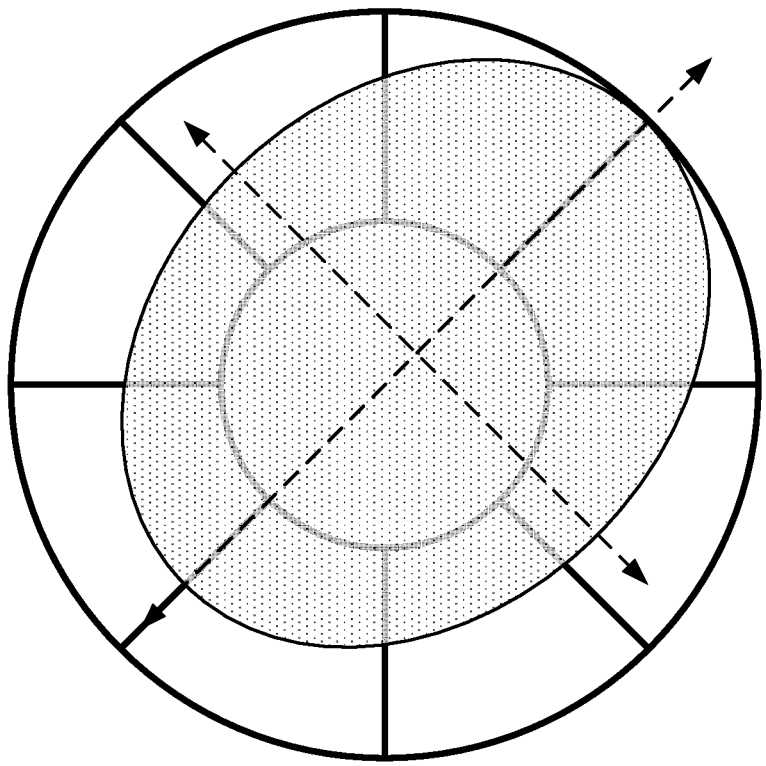
FIGS. 18 and 19 are graphical representations of exemplary tilted fluid interfaces.
Figure 19:
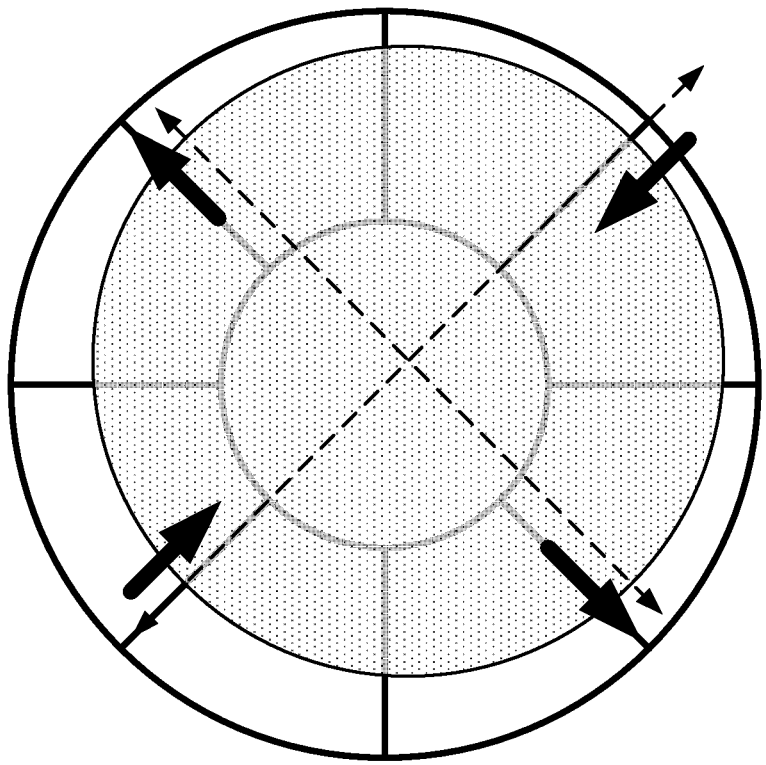

FIGS. 16-17 show an example of a fluid interface produced by a liquid lens having eight electrodes. FIG. 16 shows an example of an uncorrected fluid interface shape. FIG. 16 shows an example of an improved fluid interface shape (e.g., to increase the sphericity of the fluid interface). In FIGS. 16 and 17 the tilt direction 330 can be aligned along a center of one of the electrodes. FIG. 18 shows an example of an uncorrected fluid interface shape with the tilt direction 330 aligned along a border between electrodes. FIG. 19 shows an example of an improved fluid interface shape with the tilt direction 330 aligned along a border between electrodes.

The controller 206 can determine the voltages to be applied to the electrodes based on at least in part on the target optical power or the target radius of curvature, the target optical tilt direction or the target physical tilt direction, and/or the target optical tilt amount or the target physical tilt amount. In some cases, the controller can determine one or more of these values from other input parameters (e.g., from data received from a gyroscope or other orientation or position sensor, and/or from an autofocus system, and/or from user input). In some cases, the liquid lens does not directly control shape of the fluid interface at the region used to produce the image. However, the liquid lens can control the edge of the fluid interface 15. For example, the position of the fluid interface edge and/or the contact angle of the fluid interface edges can be controlled based on the voltages applied. An equation can represent the shape (e.g., the surface contour shape) of the fluid interface. A boundary condition can be set for the edge of the fluid interface that urges the surface of the fluid interface to conform to a desired shape (e.g., a sphere). Contact angles (e.g., for locations corresponding to each of the insulated electrodes) can be determined based at least in part on the equation and the boundary condition. The voltages (e.g., for each of the insulated electrodes) can be determined based at least in part on the determined contact angles (e.g., from the Young-Lippmann equation). Additional information regarding the determining of the voltages is provided in the attached appendix.

In some embodiments, a liquid lens system comprises a liquid lens and a controller. For example, the liquid lens comprises a chamber, a first fluid contained in the chamber, a second fluid contained in the chamber, wherein the first fluid and the second fluid are substantially immiscible to form a fluid interface between the first fluid and the second fluid, a plurality of insulated electrodes that are insulated from the first and second fluids, and one or more electrodes in electrical communication with the first fluid, wherein the liquid lens is configured such that a position of the fluid interface is based at least in part on voltages applied between the plurality of insulated electrodes and the one or more electrodes in electrical communication with the first fluid. Additionally, or alternatively, the controller is operable to provide voltages to the plurality of insulated electrodes to tilt the fluid interface along a tilt direction, wherein the tilted fluid interface is curved and has a first average radius of curvature along the tilt direction and a second average radius of curvature along a direction orthogonal to the tilt direction, and wherein the second average radius of curvature differs from the first average radius of curvature by no more than about 20%. The second average radius of curvature can differ from the first average radius of curvature by no more than about 20% when the fluid interface is tilted to produce an optical tilt amount angle of about 0.3 degrees, and when the fluid interface is curved to produce an optical power of about 10 diopters. The second average radius of curvature can differ from the first average radius of curvature by no more than about 20% when the fluid interface is tilted by a physical tilt amount angle of about 3 degrees, and when the fluid interface is curved to produce an optical power of about 10 diopters. The tilt direction can be along a border between adjacent insulated electrodes. The tilt direction can be along a center of one of the insulated electrodes. The controller can be operable to provide the voltages to the plurality of insulated electrodes such that the edge of the tilted fluid interface substantially conforms to the shape of a circle. The controller can be operable to provide the voltages to the plurality of insulated electrodes such that the edge of the tilted fluid interface has a shape that deviates from a circle by no more than about 20%. The controller can be operable to provide the voltages to the plurality of insulated electrodes such that the edge of the tilted fluid interface has a shape with a first width along the tilt direction and a second width along a direction orthogonal to the tile direction, and wherein the second width differs from the first width by no more than about 20%. The controller can be operable to apply asymmetrical voltages to the plurality of insulated electrodes.

In some embodiments, a liquid lens system comprises a liquid lens and a controller. For example, the liquid lens comprises a chamber, a first fluid contained in the chamber, a second fluid contained in the chamber, wherein the first fluid and the second fluid are substantially immiscible to form a fluid interface between the first fluid and the second fluid, a plurality of insulated electrodes that are insulated from the first and second fluids, wherein the plurality of insulated electrodes comprises a first insulated electrode on a first side of the chamber and a second insulated electrode on a second side of the chamber opposite the first side, and one or more electrodes in electrical communication with the first fluid, wherein the liquid lens is configured such that a position of the fluid interface is based at least in part on voltages applied between the plurality of insulated electrodes and the one or more electrodes in electrical communication with the first fluid. Additionally, or alternatively, the controller operable to obtain a target focal length value, wherein the controller is operable to provide a common voltage value to the plurality of insulated electrodes in response to the target focal length value when no fluid interface tilt is produced, obtain a target tilt direction, obtain a target tilt amount, provide a first voltage to the first insulated electrode based at least in part on the target focal length, the target tilt direction, and the target tilt amount, wherein the first voltage is higher than the common voltage value by a first voltage difference, and provide a second voltage to the second insulated electrode, wherein the second voltage is lower than the common voltage value by a second voltage difference to tilt the fluid interface along a tilt direction that intersects the first and second insulated electrodes, and wherein the first voltage difference is different than the second voltage difference. The first voltage difference can be less than the second voltage difference. The first voltage difference can be greater than the second voltage difference. The liquid lens system can comprise a third insulated electrode between the first insulated electrode and the second insulated electrode on a third side of the chamber, and a fourth insulated electrode between the first insulated electrode and the second insulated electrode on a fourth side of the chamber opposite the third side, wherein the controller is operable to provide a third voltage to the third insulated electrode, wherein the third voltage is higher than the common voltage by a third voltage difference, wherein the controller is operable to provide a fourth voltage to the fourth insulated electrode, wherein the fourth voltage is lower than the common voltage by a third voltage difference, and wherein the third voltage difference is different than the fourth voltage difference. The first voltage difference can be less than the second voltage difference, and the third voltage difference can be greater than the fourth voltage difference. The first voltage difference can be greater than the second voltage difference, and the third voltage difference can be less than the fourth voltage difference. The fluid interface can have an edge at the first insulated electrode and an edge at the second insulated electrode, wherein the first and second voltages cause the edge of the fluid interface at the first electrode to be lower in the cavity than edge of the fluid interface at the second electrode, to tilt the fluid interface. The controller can be operable to provide the voltages to the insulated electrodes to provide a curved and tilted fluid interface having a surface that substantially conforms to a portion of a surface of a sphere.

In some embodiments, a liquid lens system comprises a liquid lens and a controller. For example, the liquid lens comprises a chamber, a first fluid contained in the chamber, a second fluid contained in the chamber, wherein the first fluid and the second fluid are substantially immiscible to form a fluid interface between the first fluid and the second fluid, a plurality of insulated electrodes that are insulated from the first and second fluids, wherein the plurality of insulated electrodes comprises a first insulated electrode on a first side of the chamber and a second insulated electrode on a second side of the chamber opposite the first side, and one or more electrodes in electrical communication with the first fluid, wherein the liquid lens is configured such that a position of the fluid interface is based at least in part on voltages applied between the plurality of insulated electrodes and the one or more electrodes in electrical communication with the first fluid. Additionally, or alternatively, the controller is operable to provide voltages to the plurality of insulated electrodes to curve the fluid interface to provide an optical power and to tilt the fluid interface to provide an optical tilt along a tilt direction, wherein a direction orthogonal to the tilt direction extends along a center of the first insulated electrode and along a center of the second insulated electrode, wherein the controller is operable to provide a common voltage value to the plurality of insulated electrodes to produce the optical power for the fluid interface with no tilt, wherein the voltage applied to the first electrode is different than the common voltage value, and wherein the voltage applied to the second electrode is different than the common voltage value. The controller can be operable to apply the same voltage to the first electrode and the second electrode. The voltage applied to the first electrode can be higher than the common voltage, and the voltage applied to the second electrode can be higher than the common voltage. The voltage applied to the first electrode can be lower than the common voltage, and the voltage applied to the second electrode can be lower than the common voltage. The voltages applied to the insulated electrodes can be configured to produce a fluid interface shape that has a substantially spherical curvature.

In some embodiments, a method of operating a liquid lens comprises providing a first voltage to a first insulated electrode of the liquid lens, wherein the liquid lens comprises a chamber, a first fluid contained in the chamber, a second fluid contained in the chamber, wherein the first fluid and the second fluid are substantially immiscible to form a fluid interface between the first fluid and the second fluid, a plurality of insulated electrodes that are insulated from the first and second fluids, wherein the plurality of insulated electrodes comprises the first insulated electrode on a first side of the chamber, a second insulated electrode on a second side of the chamber opposite the first side, a third insulated electrode between the first insulated electrode and the second insulated electrode on a third side of the chamber, a fourth insulated electrode between the first insulated electrode and the second insulated electrode on a fourth side of the chamber opposite the third side, and one or more electrodes in electrical communication with the first fluid, wherein the liquid lens is configured such that a position of the fluid interface is based at least in part on voltages applied between the plurality of insulated electrodes and the one or more electrodes in electrical communication with the first fluid, providing a second voltage to the second insulated electrode, wherein the second voltage is lower than the first voltage to cause the fluid interface to tilt along a tilt direction, providing a third voltage to the third insulated electrode, and providing a fourth voltage to the fourth insulated electrode, wherein an average of the first and second voltages is different than an average of the third and fourth voltages. The average of the first and second voltages can be lower than the average of the third and fourth voltages. The average of the first and second voltages can be higher than the average of the third and fourth voltages. The tilt direction can extend across the first and second electrodes, and a direction orthogonal to the tilt direction can extend across the third and fourth electrodes. The fluid interface can have a substantially spherical curvature.

In some embodiments, a method of operating a liquid lens comprises applying voltages to a plurality of insulated electrodes of a liquid lens, the liquid lens comprising a chamber, a first fluid contained in the chamber, a second fluid contained in the chamber, wherein the first fluid and the second fluid are substantially immiscible to form a fluid interface between the first fluid and the second fluid, the plurality of insulated electrodes that are insulated from the first and second fluids, and one or more electrodes in electrical communication with the first fluid, wherein the liquid lens is configured such that a position of the fluid interface is based at least in part on voltages applied between the plurality of insulated electrodes and the one or more electrodes in electrical communication with the first fluid, wherein the provided voltages are operable to curve the fluid interface to produce a focal length for the liquid lens, and tilt the fluid interface by a physical tilt amount along a tilt direction, wherein the curved and tilted fluid interface has a curvature that deviates from a sphere by no more than about 20%. The physical tilt amount can be about 3 degrees, and the focal length can produce an optical power of about 10 diopters.

In some embodiments, a method of operating an electrowetting liquid lens that comprises a fluid interface between two fluids comprises tilting the fluid interface of the electrowetting liquid lens, wherein the tilted fluid interface has a substantially spherical curvature. The tilted fluid interface can have a curvature that deviates from a sphere by no more than about 20%. The fluid interface can have a first average radius of curvature along a tilt direction and a second average radius of curvature along a direction orthogonal to the tilt direction, and wherein the second average radius of curvature can differ from the first average radius of curvature by no more than about 20%. The tilted fluid interface can have a substantially spherical curvature at a physical tilt amount of at least about 3 degrees. The tilted fluid interface can have a substantially spherical curvature at a curvature that provides an optical power of at least about 10 diopters.

In some embodiments, a method of operating an electrowetting liquid lens that comprises a fluid interface between two fluids and a plurality of electrodes comprises providing voltages to the plurality of electrodes of the electrowetting liquid lens to curve the fluid interface and to tilt the curved fluid interface, wherein the voltages applied to the electrodes of the electrowetting liquid lens are asymmetrical. The electrowetting liquid lens can comprise a first electrode receiving a first voltage, a second electrode opposite the first electrode, the second electrode receiving a second voltage, and a third electrode adjacent to the first electrode, the third electrode receiving a third voltage, a fourth electrode opposite the third electrode and adjacent to the second electrode, the fourth electrode receiving a fourth voltage, wherein a difference between the first voltage and the third voltage is different than a difference between the second voltage and the fourth voltage. An average of the first voltage and the second voltage can be different than an average of the third voltage and the fourth voltage. The electrowetting liquid lens can comprise a first electrode receiving a first voltage, a second electrode opposite the first electrode, the second electrode receiving a second voltage, a third electrode receiving a third voltage, and a fourth electrode opposite the third electrode, the fourth electrode receiving a fourth voltage, wherein an average of the first voltage and the second voltage is different than an average of the third voltage and the fourth voltage. Tilt direction can extend across the first and second electrodes, and wherein a direction orthogonal to the tilt direction can extend across the third and fourth electrodes. The curved fluid interface can produce a focal length for the electrowetting liquid lens, the electrowetting liquid lens can be configured to produce the focal length with no fluid interface tilt in response to a common voltage to the plurality of electrodes, and the voltages applied to the electrodes of the electrowetting liquid lens can be asymmetrical relative to the common voltage. The plurality of electrodes can comprise a first electrode positioned on a first side and a second electrode on a second side opposite the first side, and wherein the providing voltages can comprise providing a first voltage to the first electrode, wherein the first voltage is higher than the common voltage by a first voltage difference, and providing a second voltage to the second electrode, wherein the second voltage is lower than the common voltage by a second voltage difference, wherein the second voltage difference is different than the first voltage difference. The second voltage different can be greater than the first voltage difference. The second voltage difference can be lower than the first voltage difference. The tilted fluid interface can have a substantially spherical curvature.

In some embodiments, a liquid lens system comprises a liquid lens, and a controller operable to implement any of the methods described herein.

In some embodiments, a liquid lens system comprises at least 4 insulated electrodes, at least 6 insulated electrodes, or at least 8 insulated electrodes.

In some embodiments, the liquid lens produces wave front error of less than 200 nm, less than 120 nm, less than 40 nm, less than 20 nm, or less than 10 nm.

In some embodiments, the liquid lens comprises a truncated cone cavity shape.

Although various embodiments and features are discussed herein as relating to producing a fluid interface shape that conforms to a sphere, the approaches and features disclosed herein can be used to urge a fluid interface to conform to any other suitable shape, such as a paraboloid, an ellipsoid, an ovoid, a hyperboloid, or any other suitable shape. For example, determinations similar to those discussed herein can be performed, such as using different equations or different boundary conditions, etc. to determine voltages that can be applied to produce different desired shapes.

In the disclosure provided above, apparatus, systems, and methods for control of a lens are described in connection with particular example embodiments. It will be understood, however, that the principles and advantages of the embodiments can be used for any other applicable systems, apparatus, or methods. While some of the disclosed embodiments may be described with reference to analog, digital, or mixed circuitry, in different embodiments, the principles and advantages discussed herein can be implemented for different parts as analog, digital, or mixed circuitry. In some figures, four electrodes (e.g., insulated electrodes) are shown. The principles and advantages discussed herein can be applied to embodiments with more than four electrodes or fewer than four electrodes.

The principles and advantages described herein can be implemented in various apparatuses. Examples of such apparatuses can include, but are not limited to, consumer electronic products, parts of the consumer electronic products, electronic test equipment, etc. The principles and advantages described herein relate to lenses. Examples products with lenses can include a mobile phone (for example, a smart phone), healthcare monitoring devices, vehicular electronics systems such as automotive electronics systems, webcams, a television, a computer monitor, a computer, a hand-held computer, a tablet computer, a laptop computer, a personal digital assistant (PDA), a refrigerator, a DVD player, a CD player, a digital video recorder (DVR), a camcorder, a camera, a digital camera, a copier, a facsimile machine, a scanner, a multi-functional peripheral device, a wrist watch, a clock, etc. Further, apparatuses can include unfinished products.

In some embodiments, the methods, techniques, microprocessors, and/or controllers described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. The instructions can reside in RAM memory, flash memory, ROM memory, EPROM memory, EEPROM memory, registers, hard disk, a removable disk, a CD-ROM, or any other form of a non-transitory computer-readable storage medium. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

The processor(s) and/or controller(s) described herein can be coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

The processor(s) and/or controller(s) described herein may implement the techniques described herein using customized hard-wired logic, one or more ASICs or FPGAs, firmware and/or program logic which causes microprocessors and/or controllers to be a special-purpose machine.

According to one embodiment, parts of the techniques disclosed herein are performed by a processor (e.g., a microprocessor) and/or other controller elements in response to executing one or more sequences instructions contained in a memory. Such instructions may be read into the memory from another storage medium, such as storage device. Execution of the sequences of instructions contained in the memory causes the processor or controller to perform the process steps described herein. In alternative embodiments, hard-wired circuitry may be used in place of or in combination with software instructions.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry.

Unless the context clearly requires otherwise, throughout the description and the claims, the words "comprise," "comprising," "include," "including," and the like are to be construed in an inclusive sense, as opposed to an exclusive or exhaustive sense; that is to say, in the sense of "including, but not limited to." The words "coupled" or "connected," as generally used herein, refer to two or more elements that can be either directly connected, or connected by way of one or more intermediate elements. Additionally, the words "herein," "above," "below," and words of similar import, when used in this application, shall refer to this application as a whole and not to any particular portions of this application. Where the context permits, words in the Detailed Description using the singular or plural number can also include the plural or singular number, respectively. The words "or" in reference to a list of two or more items, is intended to cover all of the following interpretations of the word: any of the items in the list, all of the items in the list, and any combination of the items in the list. All numerical values provided herein are intended to include similar values (e.g., within a range of measurement error).

Although this disclosure contains certain embodiments and examples, it will be understood by those skilled in the art that the scope extends beyond the specifically disclosed embodiments to other alternative embodiments and/or uses and obvious modifications and equivalents thereof. In addition, while several variations of the embodiments have been shown and described in detail, other modifications will be readily apparent to those of skill in the art based upon this disclosure. It is also contemplated that various combinations or sub-combinations of the specific features and aspects of the embodiments may be made and still fall within the scope of this disclosure. It should be understood that various features and aspects of the disclosed embodiments can be combined with, or substituted for, one another in order to form varying modes of the embodiments. Any methods disclosed herein need not be performed in the order recited. Thus, it is intended that the scope should not be limited by the particular embodiments described above.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. Any headings used herein are for the convenience of the reader only and are not meant to limit the scope.

Further, while the devices, systems, and methods described herein may be susceptible to various modifications and alternative forms, specific examples thereof have been shown in the drawings and are herein described in detail. It should be understood, however, that the invention is not to be limited to the particular forms or methods disclosed, but, to the contrary, the invention is to cover all modifications, equivalents, and alternatives falling within the spirit and scope of the various implementations described. Further, the disclosure herein of any particular feature, aspect, method, property, characteristic, quality, attribute, element, or the like in connection with an implementation or embodiment can be used in all other implementations or embodiments set forth herein. Any methods disclosed herein need not be performed in the order recited. The methods disclosed herein may include certain actions taken by a practitioner; however, the methods can also include any third-party instruction of those actions, either expressly or by implication.

The ranges disclosed herein also encompass any and all overlap, sub-ranges, and combinations thereof. Language such as "up to," "at least," "greater than," "less than," "between," and the like includes the number recited. Numbers preceded by a term such as "about" or "approximately" include the recited numbers and should be interpreted based on the circumstances (e.g., as accurate as reasonably possible under the circumstances, for example ±1%, ±3%, ±5%, ±10%, ±15%, etc.). For example, "about 3.5 mm" includes "3.5 mm." Recitation of numbers and/or values herein should be understood to disclose both the values or numbers as well as "about" or "approximately" those values or numbers, even where the terms "about" or "approximately" are not recited. For example, recitation of "3.5 mm" includes "about 3.5 mm." Phrases preceded by a term such as "substantially" include the recited phrase and should be interpreted based on the circumstances (e.g., as much as reasonably possible under the circumstances). For example, "substantially constant" includes "constant." Unless stated otherwise, all measurements are at standard conditions including ambient temperature and pressure.

What is claimed is:

1. A liquid lens system comprising:
   a liquid lens comprising:
      a chamber;
      a first fluid contained in the chamber;
      a second fluid contained in the chamber, wherein the first fluid and the second fluid are substantially immiscible to form a fluid interface between the first fluid and the second fluid;
      a plurality of insulated electrodes that are insulated from the first and second fluids, wherein the plurality of insulated electrodes comprise at least four electrodes that extend in a circular fashion about the first fluid and the second fluid, wherein the at least four electrodes cover a continuous circle such that consecutive ones of the at least four electrodes are adjacent each other; and
      one or more electrodes in electrical communication with the first fluid, wherein a position of the fluid interface is based at least in part on voltages applied between the plurality of insulated electrodes and the one or more electrodes in electrical communication with the first fluid; and
   a controller operable to provide voltages to the plurality of insulated electrodes to tilt the fluid interface along a tilt direction, wherein the voltages provided to the plurality of insulated electrodes include asymmetrical voltages between adjacent insulated electrodes so as to partially smooth discontinuities in the fluid interface, wherein the tilted fluid interface is curved and has a first average radius of curvature along the tilt direction and a second average radius of curvature along a direction orthogonal to the tilt direction, and wherein the second average radius of curvature differs from the first average radius of curvature by no more than about 20%.

2. The liquid lens system of claim 1, wherein the second average radius of curvature differs from the first average radius of curvature by no more than about 20% when the fluid interface is tilted to produce an optical tilt amount angle of about 0.3 degrees, and when the fluid interface is curved to produce an optical power of about 10 diopters.

3. The liquid lens system of claim 1, wherein the second average radius of curvature differs from the first average radius of curvature by no more than about 20% when the fluid interface is tilted by a physical tilt amount angle of about 3 degrees, and when the fluid interface is curved to produce an optical power of about 10 diopters.

4. The liquid lens system of claim 1, wherein the tilt direction is along a border between the adjacent insulated electrodes.

5. The liquid lens system of claim 1, wherein the tilt direction is along a center of one of the insulated electrodes.

6. The liquid lens system of claim 1, wherein the controller is operable to provide the voltages to the plurality of insulated electrodes such that the edge of the tilted fluid interface substantially conforms to the shape of a circle.

7. The liquid lens system of claim 1, wherein the controller is operable to provide the voltages to the plurality of insulated electrodes such that the edge of the tilted fluid interface has a shape that deviates from a circle by no more than about 20%.

8. The liquid lens system of claim 1, wherein the controller is operable to provide the voltages to the plurality of insulated electrodes such that the edge of the tilted fluid interface has a shape with a first width along the tilt direction and a second width along a direction orthogonal to the tilt direction, and wherein the second width differs from the first width by no more than about 20%.

9. The liquid lens system of claim 1, wherein the liquid lens produces wave front error of less than 200 nm.

10. The liquid lens system of claim 1, wherein liquid lens comprises a truncated cone cavity shape.

11. A liquid lens system comprising:
    a liquid lens comprising:
       a chamber;
       a first fluid contained in the chamber;
       a second fluid contained in the chamber, wherein the first fluid and the second fluid are substantially immiscible to form a fluid interface between the first fluid and the second fluid;
       a plurality of insulated electrodes that are insulated from the first and second fluids, wherein the plurality of insulated electrodes comprise at least four electrodes that extend in a circular fashion about the first fluid and the second fluid, wherein the at least four electrodes cover a continuous circle such that consecutive ones of the at least four electrodes are adjacent each other; and
       one or more electrodes in electrical communication with the first fluid, wherein a position of the fluid interface is based at least in part on voltages applied between the plurality of insulated electrodes and the one or more electrodes in electrical communication with the first fluid; and
    a controller operable to:
       obtain a target focal length value, wherein the controller is operable to provide a common voltage value to the plurality of insulated electrodes in response to the target focal length value when no fluid interface tilt is produced;
       obtain a target tilt direction;
       obtain a target tilt amount;
       provide a first voltage to a first insulated electrode of the plurality of insulated electrodes based at least in part on the target focal length, the target tilt direction, and the target tilt amount, wherein the first voltage is higher than the common voltage value by a first voltage difference; and
       provide a second voltage to a second insulated electrode of the plurality of insulated electrodes, wherein the second voltage is lower than the common voltage value by a second voltage difference to tilt the fluid interface along a tilt direction that intersects the first and second insulated electrodes, and wherein the first voltage difference is different than the second voltage difference.

12. The liquid lens system of claim 11, wherein the first voltage difference is less than the second voltage difference.

13. The liquid lens system of claim 11, wherein the first voltage difference is greater than the second voltage difference.

14. The liquid lens system of claim 11, comprising:
    a third insulated electrode between the first insulated electrode and the second insulated electrode on a third side of the chamber; and
    a fourth insulated electrode between the first insulated electrode and the second insulated electrode on a fourth side of the chamber opposite the third side;
    wherein the controller is operable to provide a third voltage to the third insulated electrode, wherein the third voltage is higher than the common voltage by a third voltage difference;

wherein the controller is operable to provide a fourth voltage to the fourth insulated electrode, wherein the fourth voltage is lower than the common voltage by a third voltage difference;

and wherein the third voltage difference is different than the fourth voltage difference.

15. The liquid lens system of claim 14, wherein the first voltage difference is less than the second voltage difference, and wherein the third voltage difference is greater than the fourth voltage difference.

16. The liquid lens system of claim 14, wherein the first voltage difference is greater than the second voltage difference, and wherein the third voltage difference is less than the fourth voltage difference.

17. The liquid lens system of claim 11, wherein the fluid interface has an edge at the first insulated electrode and an edge at the second insulated electrode, wherein the first and second voltages causes the edge of the fluid interface at the first electrode to be lower in the cavity than edge of the fluid interface at the second electrode, to tilt the fluid interface.

18. The liquid lens system of claim 11, wherein the controller is operable to provide the voltages to the insulated electrodes to provide a curved and tilted fluid interface having a surface that substantially conforms to a portion of a surface of a sphere.

19. A method of operating an electrowetting liquid lens that comprises a fluid interface between two fluids and a plurality of electrodes, the method comprising:

providing voltages to the plurality of electrodes of the electrowetting liquid lens to curve the fluid interface and to tilt the curved fluid interface, wherein the plurality of electrodes comprise at least four electrodes that extend in a circular fashion about the two fluids, wherein the at least four electrodes cover a continuous circle such that consecutive ones of the at least four electrodes are adjacent each other;

wherein the voltages applied to adjacent ones of the plurality of electrodes of the electrowetting liquid lens are asymmetrical such that the tilted fluid interface has a substantially spherical curvature.

* * * * *